(12) United States Patent
Horii et al.

(10) Patent No.: US 12,040,617 B2
(45) Date of Patent: Jul. 16, 2024

(54) ELECTRIC POWER SYSTEM, SERVER, CHARGE-AND-DISCHARGE CONTROLLER, AND POWER DEMAND-AND-SUPPLY ADJUSTMENT METHOD

(71) Applicants: TOYOTA JIDOSHA KABUSHIKI KAISHA, Toyota (JP); TOYOTA TSUSHO CORPORATION, Nagoya (JP)

(72) Inventors: Yusuke Horii, Nagoya (JP); Masato Ehara, Gotenba (JP); Shunsuke Kobuna, Sunto-gun (JP); Akinori Morishima, Naka-gun (JP); Ryota Soshino, Yokohama (JP)

(73) Assignees: TOYOTA JIDOSHA KABUSHIKI KAISHA, Toyota (JP); TOYOTA TSUSHO CORPORATION, Nagoya (JP)

( * ) Notice: Subject to any disclaimer, the term of this patent is extended or adjusted under 35 U.S.C. 154(b) by 375 days.

(21) Appl. No.: 17/409,376

(22) Filed: Aug. 23, 2021

(65) Prior Publication Data

US 2022/0085612 A1 Mar. 17, 2022

(30) Foreign Application Priority Data

Sep. 17, 2020 (JP) ................. 2020-156404

(51) Int. Cl.
*H02J 3/32* (2006.01)
*B60L 53/62* (2019.01)
(Continued)

(52) U.S. Cl.
CPC .............. *H02J 3/322* (2020.01); *B60L 53/62* (2019.02); *B60L 53/63* (2019.02); *B60L 53/67* (2019.02);
(Continued)

(58) Field of Classification Search
CPC ...... H02J 3/322; H02J 3/00; H02J 3/28; H02J 2310/48; B60L 53/62; B60L 53/63; B60L 53/67; B60L 55/00; Y04S 10/126
(Continued)

(56) References Cited

U.S. PATENT DOCUMENTS

| 2013/0173331 A1* | 7/2013 | Mohagheghi ........... H02J 3/322 |
| | | 705/7.25 |
| 2016/0226249 A1 | 8/2016 | Sakuma et al. |

(Continued)

FOREIGN PATENT DOCUMENTS

| CN | 110062988 A | 7/2019 |
| EP | 3 046 200 A1 | 7/2016 |

(Continued)

*Primary Examiner* — Edward Tso
*Assistant Examiner* — Aaron Piggush
(74) *Attorney, Agent, or Firm* — Finnegan, Henderson, Farabow, Garrett & Dunner, LLP

(57) ABSTRACT

An electric power system includes a plurality of power adjustment resources electrically connectable to a power grid, and a management device configured to manage the power adjustment resources. The management device is configured to acquire a first request signal for requesting demand-and-supply adjustment in the power grid, and a second request signal for requesting the power adjustment resources to adjust electric energy in a predetermined period, transmit a power command signal indicating a command power value for each predetermined interval in the predetermined period to a predetermined power adjustment resource included in the power adjustment resources, and generate the power command signal to respond to both requests of the first request signal and the second request signal.

18 Claims, 12 Drawing Sheets

(51) Int. Cl.
   *B60L 53/63*   (2019.01)
   *B60L 53/67*   (2019.01)
   *B60L 55/00*   (2019.01)
   *H02J 3/28*    (2006.01)
   *H02J 3/00*    (2006.01)

(52) U.S. Cl.
   CPC ............... *B60L 55/00* (2019.02); *H02J 3/28* (2013.01); *H02J 3/00* (2013.01); *H02J 2310/48* (2020.01); *Y04S 10/126* (2013.01)

(58) Field of Classification Search
   USPC ............................... 320/162, 104, 109, 155
   See application file for complete search history.

(56) References Cited

U.S. PATENT DOCUMENTS

| | | | |
|---|---|---|---|
| 2017/0267115 A1 | 9/2017 | Unno et al. | |
| 2018/0244170 A1* | 8/2018 | Kydd | H02J 7/35 |
| 2019/0280509 A1* | 9/2019 | Yokoyama | H02J 7/00 |

FOREIGN PATENT DOCUMENTS

| | | |
|---|---|---|
| JP | 2017-169313 A | 9/2017 |
| WO | WO 2015/037654 A1 | 3/2015 |
| WO | WO 2018/084151 A1 | 5/2018 |

* cited by examiner

FIG. 7
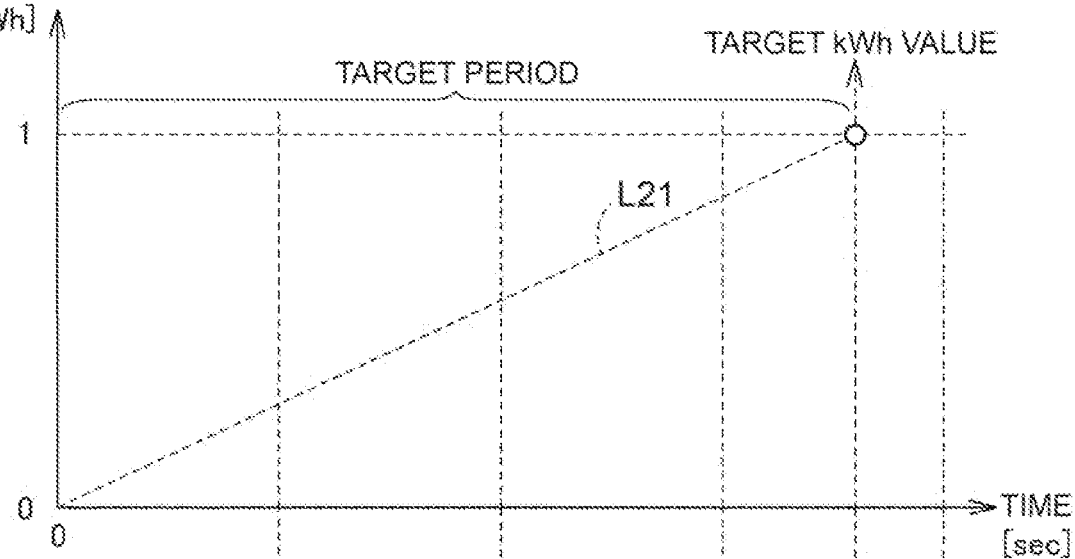
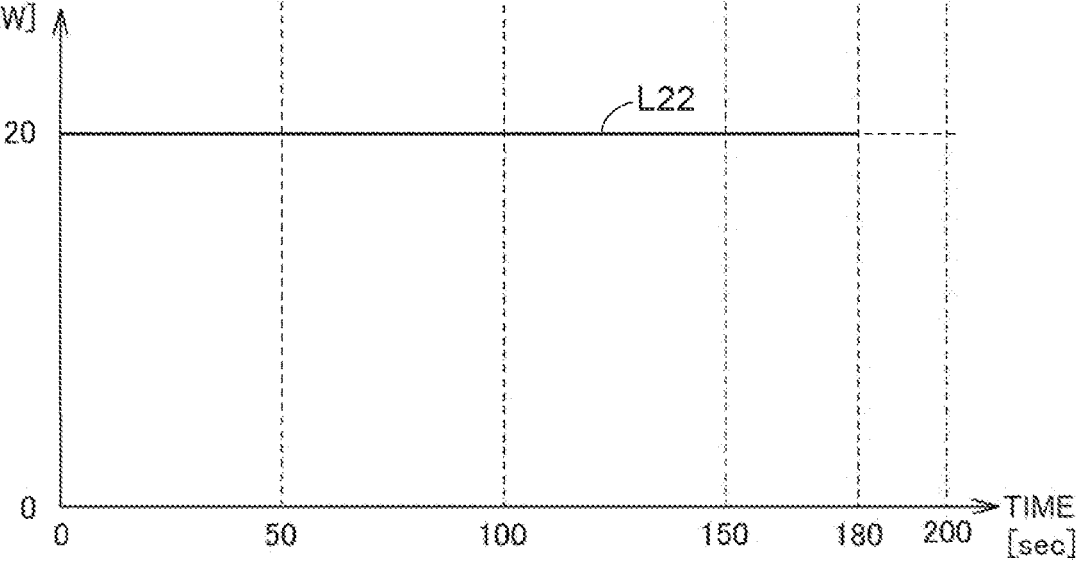
≪ FIRST EXAMPLE: kWh TO kW SIGNAL CONVERSION ≫

《 FIRST EXAMPLE: POWER COMMAND SIGNAL 》

≪SECOND EXAMPLE: POWER COMMAND SIGNAL≫

ELECTRIC POWER SYSTEM, SERVER, CHARGE-AND-DISCHARGE CONTROLLER, AND POWER DEMAND-AND-SUPPLY ADJUSTMENT METHOD

CROSS-REFERENCE TO RELATED APPLICATION

This application claims priority to Japanese Patent Application No. 2020-156404 filed on Sep. 17, 2020, incorporated herein by reference in its entirety.

BACKGROUND

1. Technical Field

The present disclosure relates to an electric power system, a server, a charge-and-discharge controller, and a power demand-and-supply adjustment method.

2. Description of Related Art

For example, International Publication No. 2018/084151 (WO 2018/084151 A) discloses a server configured to control charge and discharge of a storage battery in response to a request to switch short-term charge and discharge from the storage battery to a power grid (frequency adjustment request), or a request for continuous discharge from the storage battery to the power grid (spinning reserve request). The server selects the frequency adjustment request or the spinning reserve request based on a state of charge (SOC) of the storage battery.

SUMMARY

The server described in WO 2018/084151 A can respond only to the frequency adjustment request or the spinning reserve request. When responding to the frequency adjustment request, the server concentrates on frequency adjustment.

In recent years, attention has been directed to a microgrid, which is a group of a plurality of power adjustment resources (for example, distributed power supplies, power storage devices, and electric devices) defining a network. A server that manages the microgrid may request the power adjustment resources to adjust electric energy in a predetermined period from the viewpoint of, for example, economics and/or reduction of carbon dioxide emission ($CO_2$ minimum). The adjustment of electric energy in the predetermined period is hereinafter referred to simply as "electric energy adjustment". The electric energy adjustment executed by the power adjustment resources can achieve adjustment of electric energy to be supplied from the power grid to the microgrid in the predetermined period.

In a case where requests are made for demand-and-supply adjustment in the power grid (for example, frequency adjustment) and electric energy adjustment for the power adjustment resources, the server described in WO 2018/084151 A has difficulty in responding simultaneously to both the requests.

The present disclosure provides an electric power system, a server, a charge-and-discharge controller, and a power demand-and-supply adjustment method capable of responding simultaneously to both the request for the demand-and-supply adjustment in the power grid and the request for the electric energy adjustment for the power adjustment resources.

An electric power system according to a first aspect of the present disclosure includes a plurality of power adjustment resources and a management device. The power adjustment resources are electrically connectable to a power grid. The management device is configured to manage the power adjustment resources. The management device is configured to acquire a first request signal for requesting demand-and-supply adjustment in the power grid, and a second request signal for requesting the power adjustment resources to adjust electric energy in a predetermined period. The management device is configured to transmit a power command signal indicating a command power value for each predetermined interval in the predetermined period to a predetermined power adjustment resource included in the power adjustment resources. The management device is configured to generate the power command signal to respond to both requests of the first request signal and the second request signal.

In the electric power system, the predetermined power adjustment resource can be commanded to execute both the demand-and-supply adjustment in the power grid and the electric energy adjustment in the predetermined period based on the generated power command signal. The predetermined power adjustment resource operates based on the command power value indicated by the power command signal (that is, the command power value for each predetermined interval in the predetermined period) to respond simultaneously to both the request for the demand-and-supply adjustment in the power grid and the request for the electric energy adjustment in the predetermined period.

In the aspect described above, the management device may be configured to generate the power command signal by superimposing the first request signal and the second request signal.

In the aspect described above, the predetermined power adjustment resource may include a motor vehicle electrically connectable to the power grid. The management device may include a first computer configured to manage a business place, and a second computer configured to manage the motor vehicle. The first computer may be configured to generate the second request signal by using a power load of the business place, and transmit the generated second request signal to the second computer. The second computer may be configured to receive the first request signal, and generate the power command signal for the motor vehicle to respond to both the requests of the first request signal and the second request signal.

In the electric power system, the second request signal is generated based on the power load of the business place. The motor vehicle adjusts electric power based on the power command signal that responds to the request of the generated second request signal. Therefore, the electric power cost and the carbon dioxide emission can be reduced in the business place.

The motor vehicle travels by using electric power stored in a power storage device. Examples of the motor vehicle include an electric vehicle (EV), a plug-in hybrid vehicle (PHV), a fuel cell vehicle (FCV), and a range extender EV. The power storage device is configured to store electric power, and any storage method may be employed. The power storage device may store electric power (electric energy) as it is, or may store the electric power by converting the electric power into other energy (for example, liquid fuel or gas fuel serving as an energy source). Examples of the power storage device include a secondary battery and a Power-to-Gas (PtG) device.

The business place may define a microgrid. The business place may be a factory. The first computer may be a factory energy management system (FEMS) server or a building energy management system (BEMS) server.

In the aspect described above, the business place may include a nature-fluctuating power supply. The first computer may be configured to generate the second request signal by using electric energy to be generated by the nature-fluctuating power supply in the business place and the power load of the business place to prevent electric energy to be supplied from the power grid to the business place in the predetermined period from exceeding a predetermined value.

The nature-fluctuating power supply generates electric energy that fluctuates depending on a weather condition. Examples of the nature-fluctuating power supply include a photovoltaic power generation facility and a wind turbine generator. The nature-fluctuating power supply generates electric power by using renewable energy. Therefore, the carbon dioxide emission can be reduced in the business place by securing at least a part of the electric power for use in the business place using the nature-fluctuating power supply. In the electric power system, the second request signal is generated by using the electric energy to be generated by the nature-fluctuating power supply. Therefore, the second request signal can be generated based on the fluctuating electric energy to be generated by the nature-fluctuating power supply. The second request signal is generated to prevent the electric energy to be supplied from the power grid to the business place in the predetermined period from exceeding the predetermined value. Therefore, an excessive increase in the electric energy supplied from the power grid to the business place is suppressed.

In the aspect described above, the first request signal may be a signal for requesting frequency adjustment in the power grid, and the second computer may be configured to receive the first request signal from a third computer configured to manage demand and supply of the power grid.

According to the electric power system, it is possible to respond simultaneously to both the request for the frequency adjustment in the power grid and the request for the electric energy adjustment for the power adjustment resource.

The first request signal may be a load frequency control (LFC) signal. The first request signal may also be a signal for requesting a governor-free operation. The third computer may be a server of a power transmission/distribution utility, a server in a demand-and-supply adjustment market, or a server of an aggregator.

The predetermined period in the second request signal (hereinafter referred to also as "target period") may be set to a length appropriate to adjust electric energy (kWh). The predetermined interval in the power command signal (hereinafter referred to also as "command interval") may be set to an interval appropriate to adjust electric power (kW). The target period and the command interval may be set in the following ranges.

In the aspect described above, a length of the predetermined period may be equal to or larger than three minutes, and the predetermined interval may be equal to or shorter than 15 seconds. The length of the target period may be equal to or larger than three minutes and equal to or smaller than three hours, or may be equal to or larger than 30 minutes and equal to or smaller than one hour. The command interval may be equal to or longer than 0.1 milliseconds and equal to or shorter than 15 seconds, or may be equal to or longer than 0.1 seconds and equal to or shorter than five seconds.

A server according to a second aspect of the present disclosure is configured to manage a plurality of power adjustment resources electrically connectable to a power grid.

The server is configured to receive a first request signal for requesting demand-and-supply adjustment in the power grid, and a second request signal for requesting the power adjustment resources to adjust electric energy in a predetermined period, generate a power command signal indicating a command power value for each predetermined interval in the predetermined period to respond to both requests of the first request signal and the second request signal, and transmit the generated power command signal to a predetermined power adjustment resource included in the power adjustment resources.

In the server, the predetermined power adjustment resource can be commanded to execute both the demand-and-supply adjustment in the power grid and the electric energy adjustment in the predetermined period based on the generated power command signal. Thus, it is possible to respond simultaneously to both the request for the demand-and-supply adjustment in the power grid and the request for the electric energy adjustment for the power adjustment resource.

A charge-and-discharge controller according to a third aspect of the present disclosure is configured to control charge and discharge of a power storage device electrically connectable to a power grid, acquire a first request signal for requesting demand-and-supply adjustment in the power grid, and a second request signal for requesting the power storage device to adjust electric energy in a predetermined period, and control the charge and discharge of the power storage device to respond simultaneously to both requests of the first request signal and the second request signal.

According to the charge-and-discharge controller, the charge and discharge of the power storage device can be controlled to respond simultaneously to both the request for the demand-and-supply adjustment in the power grid and the request for the electric energy adjustment for the power storage device.

A power demand-and-supply adjustment method according to a fourth aspect of the present disclosure includes generating a power command signal indicating a command power value for each predetermined interval in a predetermined period to respond to both a request for demand-and-supply adjustment in a power grid and a request for electric energy adjustment in the predetermined period for a power adjustment resource electrically connectable to the power grid, and controlling the power adjustment resource based on the power command signal.

According to the power demand-and-supply adjustment method, it is possible to generate the power command signal that responds to both the request for the demand-and-supply adjustment in the power grid and the request for the electric energy adjustment for the power adjustment resource, and control the power adjustment resource based on the generated power command signal. Thus, it is possible to respond simultaneously to both the request for the demand-and-supply adjustment in the power grid and the request for the electric energy adjustment for the power adjustment resource.

According to the present disclosure, it is possible to provide the electric power system, the server, the charge-and-discharge controller, and the power demand-and-supply adjustment method capable of responding simultaneously to both the request for the demand-and-supply adjustment in the power grid and the request for the electric energy adjustment for the power adjustment resources.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram illustrating a target kWh value requested by a second request signal and a second power signal generated from the target kWh value according to a first example;

DETAILED DESCRIPTION OF EMBODIMENTS

Figure 1:
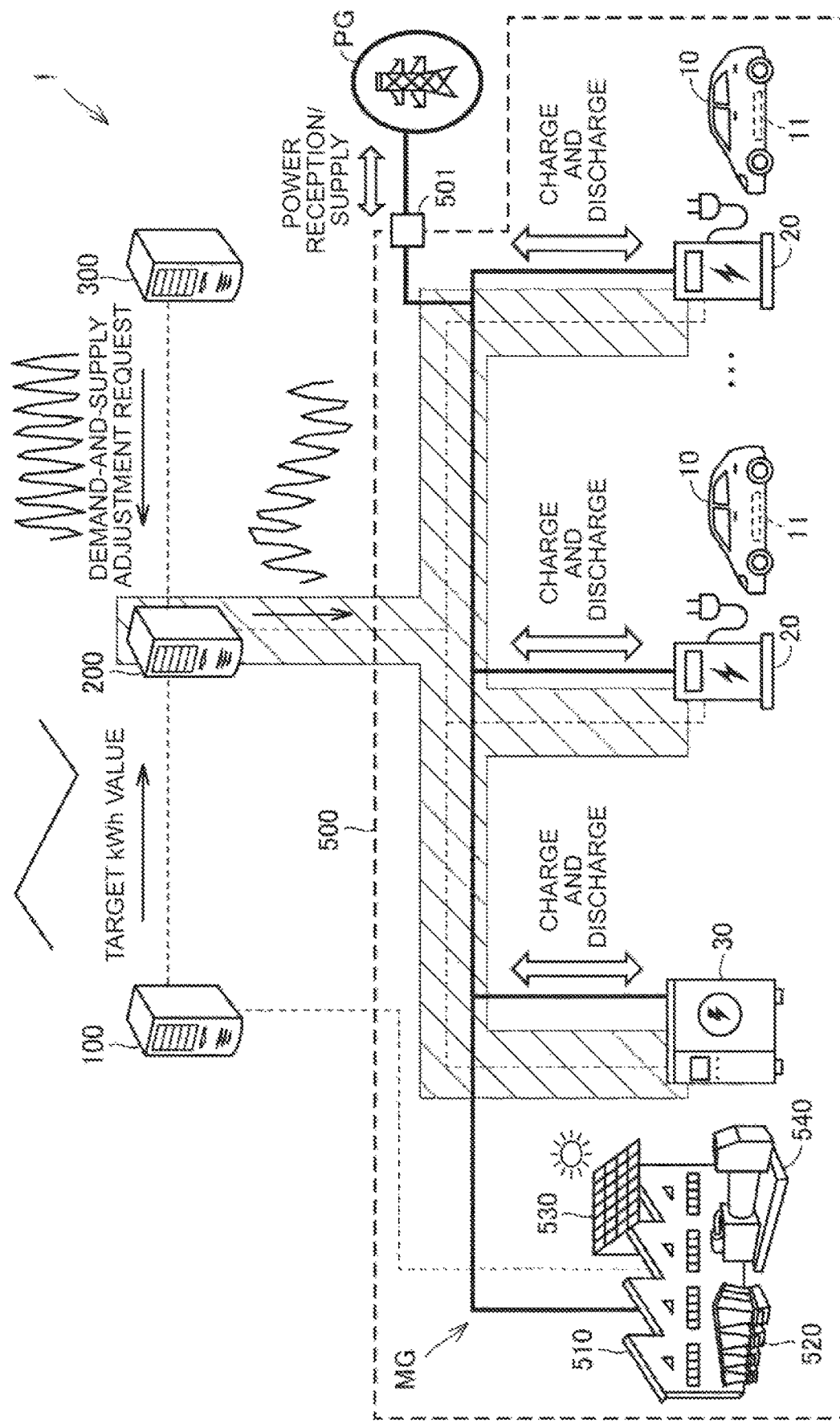
FIG. 1 is a diagram illustrating a schematic configuration of an electric power system according to an embodiment of the present disclosure.

An embodiment of the present disclosure is described in detail with reference to the drawings. In the drawings, the same or corresponding parts are represented by the same reference symbols to omit repetitive description.

FIG. 1 is a diagram illustrating a schematic configuration of an electric power system according to the embodiment of the present disclosure. Referring to FIG. 1, an electric power system 1 includes a power grid PG, a plurality of vehicles 10, a FEMS server 100 (hereinafter referred to simply as "server 100"), an aggregator server 200 (hereinafter referred to simply as "server 200"), a power transmission/distribution utility server 300 (hereinafter referred to simply as "server 300"), a factory 500, and a power substation 501. The FEMS stands for "Factory Energy Management System". The aggregator is an electric utility that provides an energy management service by aggregating a plurality of power adjustment resources. The factory 500 corresponds to an example of "business place" according to the present disclosure.

The power grid PG is constituted by power plants (not illustrated) and power transmission/distribution facilities (not illustrated). In this embodiment, a power company serves both as a power generation utility and a power transmission/distribution utility. The power company corresponds to a general power transmission/distribution utility responsible for maintenance and management of the power grid PG. The power company corresponds to a manager of the power grid PG. The server 300 is a computer configured to manage demand and supply in the power grid PG, and belongs to the power company. The power grid PG and the server 300 correspond to examples of "power grid" and "third computer" according to the present disclosure, respectively.

The aggregator manages the vehicles 10. The server 200 is a computer configured to manage the vehicles 10, and belongs to the aggregator. The server 200 corresponds to an example of "second computer" according to the present disclosure. Examples of the vehicles 10 include an electric vehicle (EV) having a power storage device 11. Each vehicle 10 is configured to execute external power charge and external power supply. The external power charge means that the power storage device 11 of the vehicle 10 is charged with electric power supplied from the outside of the vehicle 10. The external power supply means that the vehicle 10 supplies electric power to the outside by using electric power discharged from the power storage device 11 of the vehicle 10. Each vehicle 10 corresponds to an example of "power adjustment resource" according to the present disclosure. In this embodiment, the vehicles 10 in the electric power system 1 have the same configuration. The electric power system 1 may include a plurality of types of vehicle having different configurations. The electric power system 1 may include at least one of a privately owned vehicle (POV) and a vehicle managed by a Mobility-as-a-Service (MaaS) company (MaaS vehicle).

The factory 500 defines a microgrid MG by a plurality of power adjustment resources described later. Power lines for networking the power adjustment resources in the microgrid MG may be private power lines. The power substation 501 is provided at a network connection point (power receiving point) of the microgrid MG, and is configured to switch parallel-ON (connection) and parallel-OFF (disconnection) between the power grid PG and the microgrid MG. When the microgrid MG is connected to the power grid PG, the power substation 501 receives, for example, alternating-current (AC) power at an extra-high voltage (voltage higher than 7000 V) from the power grid PG, and supplies the received electric power to the microgrid MG by stepping down the electric power. The power substation 501 includes switchgear (for example, a section switch, a disconnector, a circuit-breaker, and a load-break switch) on a high-voltage side (primary side), a transformer, a protection relay, a measurement device, and a controller. The electric power to be received by the power substation 501 from the power grid PG is not limited to the electric power at the extra-high voltage, and may be, for example, electric power at a high voltage (voltage higher than 600 V and equal to or lower than 7000 V).

For example, the factory 500 may be an automobile manufacturing factory or other factories. A plurality of elements in the factory 500 constitutes the microgrid MG by being electrically connected together. Specifically, the factory 500 includes a plurality of EVSEs 20, a stationary power storage device 30, a building 510, industrial facilities 520, a nature-fluctuating power supply 530, and a generator 540.

Each EVSE 20 is installed in a site of the factory 500. The EVSE stands for "Electric Vehicle Supply Equipment". Each EVSE 20 is electrically connected to the microgrid MG to exchange electric power between the EVSE 20 and the microgrid MG. The vehicle 10 is electrically connectable to the EVSE 20. For example, electric power can be exchanged between the EVSE 20 and the vehicle 10 such that an outlet cable connected to the EVSE 20 is connected to an inlet of the vehicle 10. The factory 500 may have any number of EVSEs 20, such as five, 10 or more, or 100 or more.

The stationary power storage device 30 is installed in the site of the factory 500. The stationary power storage device 30 is electrically connected to the microgrid MG to exchange electric power between the stationary power storage device 30 and the microgrid MG. In this embodiment, a lithium ion battery is employed as the stationary power storage device 30. The lithium ion battery may be a battery used in a vehicle (recycled battery). The stationary power storage device 30 is not limited to the lithium ion battery, and may be any other secondary battery or a Power-to-Gas (PtG) device. This embodiment employs one stationary power storage device 30, but the factory 500 may have any number of stationary power storage devices 30, such as five, 10 or more, or 100 or more.

For example, workers in the factory 500 come in and out the building 510. The building 510 includes various electric devices (for example, lights and air conditioners) configured to operate by using electric power supplied from the microgrid MG. In this embodiment, generators (nature-fluctuating power supply 530 and generator 540) are provided only outside the building 510, but may be provided in the building 510.

The industrial facilities 520 are used outdoors, and operate by using electric power supplied from the microgrid MG. The industrial facilities 520 according to this embodiment include an electric melting furnace and a holding furnace for aluminum. The industrial facilities 520 may include at least one of a drainage plant for water drainage, and a recycling plant for waste recycling.

The nature-fluctuating power supply 530 generates electric power that fluctuates depending on a weather condition, and outputs the generated electric power to the microgrid MG. The electric power generated by the nature-fluctuating power supply 530 corresponds to variable renewable energy (VRE). Surplus electric power generated by the nature-fluctuating power supply 530 may be stored in the stationary power storage device 30. In this embodiment, a PV power generation facility (for example, a solar panel on a roof) is employed as the nature-fluctuating power supply 530. The PV power generation stands for photovoltaic power generation. The nature-fluctuating power supply 530 is not limited to the PV power generation facility, and may include a wind turbine generator in place of or in addition to the PV power generation facility.

The generator 540 does not correspond to the nature-fluctuating power supply, and outputs generated electric power to the microgrid MG. In this embodiment, a steam turbine generator is employed as the generator 540. The generator 540 is not limited to the steam turbine generator, and may include at least one of a gas turbine generator, a diesel engine generator, a gas engine generator, and a biomass generator in place of or in addition to the steam turbine generator. The factory 500 may include a cogeneration system using heat generated during power generation.

The server 100 manages the factory 500. The stationary power storage device 30, the building 510, the industrial facilities 520, the nature-fluctuating power supply 530, and the generator 540 in the factory 500 correspond to examples of "power adjustment resource" according to the present disclosure. The server 100 manages the power adjustment resources. The server 100 corresponds to an example of "first computer" according to the present disclosure.

Figure 2:
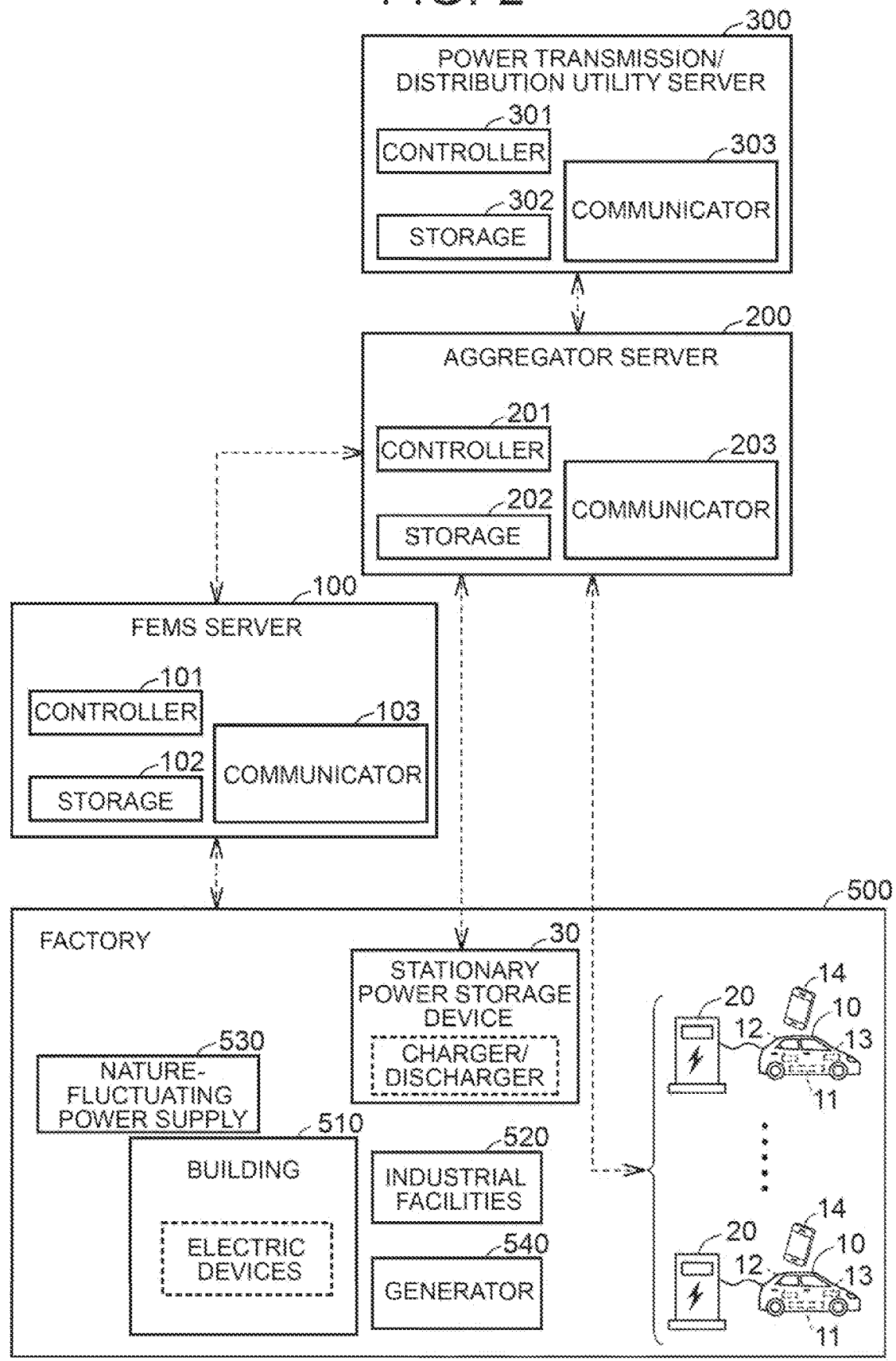
FIG. 2 is a diagram illustrating internal configurations of servers and vehicles in the electric power system illustrated in FIG. 1.

FIG. 2 is a diagram illustrating internal configurations of the servers 100, 200, and 300 and the vehicles 10. Referring to FIG. 2, the servers 100, 20), and 300 include controllers 101, 201, and 301, storages 102, 202, and 302, and communicators 103, 203, and 303, respectively. The controllers 101, 201, and 301 include processors to execute predetermined information processes. The storages 102, 202, and 302 can store various types of information. The storages 102, 202, and 302 store programs to be executed by the controllers 101, 201, and 301 and information for use in the programs (for example, maps, mathematical expressions, and various parameters), respectively. The communicators 103, 203, and 303 include various communication interfaces (I/Fs). The controllers 101, 201, and 301 communicate with the outside via the communicators 103, 203, and 303, respectively.

Each vehicle 10 includes a charger/discharger 12 and an electronic control unit (ECU) 13 in addition to the power storage device 1L. The charger/discharger 12 adjusts charge/discharge power of the power storage device 11. The ECU 13 controls the charger/discharger 12. The ECU 13 includes a processor (for example, a central processing unit (CPU)), a random access memory (RAM), a storage, and a timer (none of which is illustrated). The ECU 13 may be a microcomputer.

The power storage device 11 includes a secondary battery configured to store traveling electric power. In this embodiment, a battery pack including a plurality of lithium ion batteries is employed as the secondary battery. The battery pack has a plurality of electric cells (generally referred to also as "cells") electrically connected together. Any other power storage device such as an electric double layer capacitor may be employed in place of the secondary battery.

In this embodiment, a direct-current (DC) EVSE is employed as the EVSE 20. Therefore, DC power is supplied from the vehicle 10 to the EVSE 20, and an inverter in the EVSE 20 executes DC/AC conversion. For example, the charger/discharger 12 adjusts charge/discharge power by a DC/DC converter. The Standard for the DC-EVSE may be CHAdeMO, Combined Charging System (CCS), GB/T, or Tesla. The EVSE 20 is not limited to the DC-EVSE, and may be an AC-EVSE. In a system in which the vehicle executes external power supply to the AC-EVSE, the charger/discharger 12 may include a rectifying circuit, a power factor correction (PFC) circuit, an isolation circuit (for example, an isolation transformer), an inverter, and a filter circuit. The charger/discharger 12 may execute DC/AC conversion for electric power discharged from the power storage device 11, and AC power obtained through the conversion may be supplied from the vehicle 10 to the EVSE.

Users of the vehicles 10 have mobile terminals 14, respectively. In this embodiment, a smartphone having a touch panel display is employed as each mobile terminal 14. The mobile terminal 14 is not limited to the smartphone, and may be any mobile terminal such as a tablet terminal, a wearable device (for example, a smart watch), or an electronic key. Predetermined application software (hereinafter referred to simply as "application") is installed in the mobile terminal 14. The mobile terminal 14 exchanges information with the server 200 via the application. The user may operate the mobile terminal 14 to transmit, to the server 200, an operation schedule of the vehicle 10 belonging to the user. Examples of the operation schedule of the vehicle 10 include a driving schedule of a POV (for example, departure time, destination, and arrival time) or a service schedule of a MaaS vehicle.

The server 100 manages conditions of the power adjustment resources used in the factory 500 (for example, power consumption, generated electric power, and stored electric power). The conditions of the power adjustment resources in the factory 500 are stored in the storage 102. Identification information for identifying each power adjustment resource (hereinafter referred to also as "resource ID") is assigned to each power adjustment resource. The server 100 manages information on each power adjustment resource while distinguishing the information based on its resource ID. The controller 101 detects the condition of each power adjustment resource in the factory 500 by using various sensors (not illustrated), and updates data in the storage 102.

The server 200 manages information on each registered user (hereinafter referred to also as "user information"), information on each registered vehicle 10 (hereinafter referred to also as "vehicle information"), information on each registered EVSE 20 (hereinafter referred to also as "EVSE information"), and information on the registered stationary power storage device 30 (hereinafter referred to also as "PS information"). The user information, the vehicle information, the EVSE information, and the PS information are stored in the storage 202 while being distinguished based on identification information (ID).

A user ID is identification information for identifying each user, and also functions as information for identifying the mobile terminal 14 of the user (terminal ID). The server 200 stores information received from the mobile terminal 14 while distinguishing the information based on the user ID. The user information contains a communication address of the mobile terminal 14 of the user and a vehicle ID of the vehicle 10 belonging to the user.

The vehicle ID is identification information for identifying each vehicle 10. The vehicle ID may be a vehicle identification number (VIN). The vehicle information contains an operation schedule of each vehicle 10. An EVSE-ID is identification information for identifying each EVSE 20. The EVSE information contains a communication address of each EVSE 20 and a condition of the vehicle 10 connected to the EVSE 20. The EVSE information also contains information indicating a combination of the vehicle 10 and the EVSE 20 connected together (for example, a combination of the EVSE-ID and the vehicle ID). In this embodiment, the server 200 communicates with the EVSE 20 and with the vehicle 10 connected to the EVSE 20 via the EVSE 20. The server 200 acquires, from the vehicle 10 connected to the EVSE 20, the condition of the vehicle 10 (for example, a state of charge (SOC) of the power storage device 11). The vehicle 10 may directly communicate with the server 200 by wireless. The vehicle 10 may include a data communication module (DCM) or a communication I/F that supports the fifth-generation mobile communication system (5G).

A PS-ID is identification information for identifying the stationary power storage device 30. The PS information contains a condition and a communication address of the stationary power storage device 30. The server 200 stores the condition of the stationary power storage device 30 (for example, a SOC) that is received from the stationary power storage device 30 while linking the condition to the PS-ID.

In this embodiment, the charger/discharger 12 of each vehicle 10 and a charger/discharger of the stationary power storage device 30 are remotely operated by the server 200 to execute charge and discharge in response to instructions from the server 200. Each vehicle 10 exchanges electric power between the microgrid MG and the power storage device 11 through the external power charge and the external power supply. By exchanging electric power between the microgrid MG and each of the power storage device 11 and the stationary power storage device 30 through the remote operation from the server 200, demand-and-supply adjustment is executed in the microgrid MG.

In this embodiment, a manager of the factory 500 exchanges a power contract with a power company. The power company is paid for power supply to the factory 500 under the power contract. The factory 500 (microgrid MG) is supplied with electric power from the power grid PG. Maximum electric power suppliable from the power grid PG to the factory 500 (hereinafter referred to also as "maximum contract power") is determined under the power contract. The server 100 executes the demand-and-supply adjustment in the microgrid MG in cooperation with the server 200 to prevent electric power to be supplied from the power grid PG to the microgrid MG from exceeding the maximum contract power.

The maximum contract power may be electric power (kWh/h) obtained by dividing electric energy in a predetermined target period (kWh) by a length of the target period (h), in this embodiment, the length of the target period is 30 minutes (=0.5 hours). The server 100 executes the demand-and-supply adjustment in the microgrid MG to prevent a value (kW) obtained by dividing the electric energy in the target period (kWh) by 0.5 h from exceeding the maximum contract power. When the target period elapses, a subsequent target period is set continuously. Therefore, the target period is set every 30 minutes. After an elapse of each target period, the electric energy in the target period is evaluated. The server 100 executes the demand-and-supply adjustment in the microgrid MG to prevent a value obtained by doubling the electric energy to be supplied from the power grid PG to the microgrid MG in the target period from exceeding the maximum contract power.

In the electric power system 1 according to this embodiment, the server 200 receives, from the server 300, a first request signal for requesting demand-and-supply adjustment in the power grid PG. For example, the first request signal is a signal for requesting frequency adjustment in the power grid PG. The first request signal may be a request for frequency adjustment only in a forward power flow or a reverse power flow, or a request for frequency adjustment alternately in the forward power flow and the reverse power flow. The first request signal may be a load frequency control (LFC) signal. The first request signal is not limited to the LFC signal, and may be an economic load dispatching control (EDC) signal or a signal obtained by superimposing the LFC signal and the EDC signal. The server 200 may receive a plurality of types of first request signal.

The server 200 receives, from the server 100, a second request signal for requesting any vehicle 10 to adjust the electric energy in the target period. The second request signal may be a signal for requesting the vehicle 10 to set the electric energy in the target period (kWh) to a predetermined target value (hereinafter referred to as "target kWh value").

The target kWh value in the target period may be determined at or immediately before the start of the target period.

The server 20 selects any vehicle 10 to be requested for power adjustment. The selected vehicle 10 is hereinafter referred to also as "adjustment vehicle". The number of adjustment vehicles to be selected is a number necessary to respond to both the requests of the first request signal and the second request signal. When the vehicle 10 executes frequency adjustment in the target period by repeatedly charging and discharging the power storage device 11, the SOC of the power storage device 11 hardly changes before and after the target period. Therefore, when the frequency adjustment is requested by the first request signal, the server 200 can respond to the request of the first request signal in many cases as long as the adjustment vehicle is selected to respond to the request of the second request signal. The adjustment vehicle corresponds to an example of "predetermined power adjustment resource" according to the present disclosure. The following description is directed to a case where two or more vehicles are the adjustment vehicles. If the requested power adjustment level is low, one vehicle may be the adjustment vehicle.

The server 200 generates a power command signal for the adjustment vehicles to respond to both the requests of the first request signal and the second request signal. The power command signal indicates a command power value for each predetermined command interval in the target period. The power command signal may be common to the adjustment vehicles or may vary depending on the adjustment vehicles. In this embodiment, the command interval is 0.5 seconds. The command interval is not limited to 0.5 seconds, and may be set arbitrarily. The command interval may be a fixed value or may be variable depending on the type of the first request signal. The command power value may be a discharge power value or a charge power value. For example, the discharge power value may be a positive command power value, and the charge power value may be a negative command power value.

The server 200 remotely operates the charger/dischargers 12 of the adjustment vehicles by transmitting the power command signal to each of the adjustment vehicles in the target period. The charger/dischargers 12 of the adjustment vehicles are remotely operated to set the charge/discharge power of the power storage devices 11 of the adjustment vehicles to the command power value indicated by the power command signal.

Figure 3:
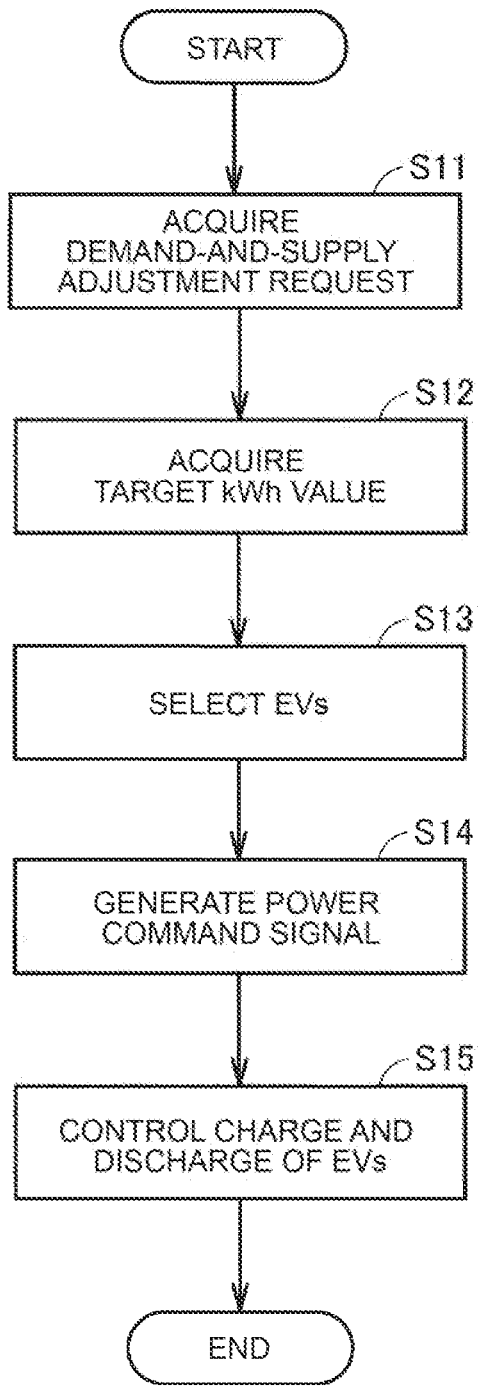
FIG. 3 is a flowchart illustrating a power demand-and-supply adjustment method according to the embodiment of the present disclosure.

FIG. 3 is a flowchart illustrating a power demand-and-supply adjustment method to be executed by the server 200. For example, processes in this flowchart are executed at or immediately before the start of the target period. Processes of S11 to S15 in the following description may be executed every time the target period has started or the timing to start the target period is coming.

Referring to FIG. 3 together with FIG. 1 and FIG. 2, in Step (hereinafter represented simply by "S") 11, the controller 201 acquires a first request signal (power adjustment request) for a target period from the server 300. In S12, the controller 201 acquires a second request signal (target kWh value) for the target period from the server 100. In the example illustrated in FIG. 3, S11 and S12 are executed in this order, but may be reversed.

In S13, the controller 201 selects adjustment vehicles from among the vehicles 10 registered in the server 200 to respond to both the requests of the first request signal and the second request signal. At this time, the controller 201 determines requested power adjustment levels of the adjustment vehicles based on conditions of the adjustment vehicles (for example, the SOCs of the power storage devices 11).

In S14, the controller 201 generates, for each adjustment vehicle, a power command signal for responding to both the requests of the first request signal and the second request signal in the target period, in S14, the power command signal is generated to respond to both the request of the first request signal (that is, the request for demand-and-supply adjustment in the power grid PG) and the request of the second request signal (that is, the request for electric energy adjustment in the target period). S14 corresponds to an example of "signal generation step".

In S15, the controller 201 controls charge and discharge of the power storage devices 11 of the adjustment vehicles by transmitting the power command signal to each of the adjustment vehicles in the target period. In S15, the adjustment vehicles are controlled based on the power command signal. S15 corresponds to an example of "control step".

Figure 4:
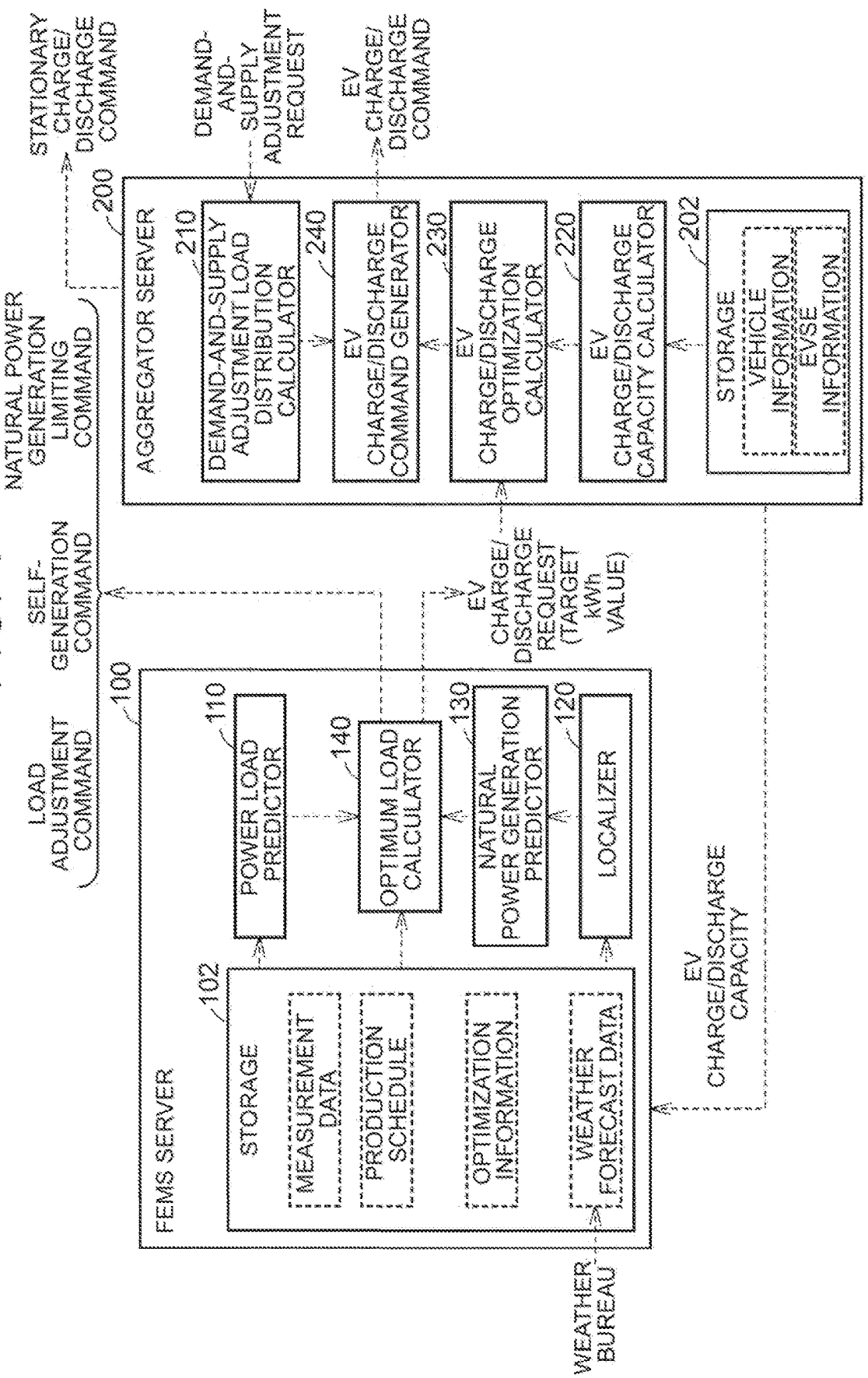
FIG. 4 is a functional block diagram illustrating functions of components of a FEMS server and an aggregator server in the electric power system illustrated in FIG. 1.

FIG. 4 is a functional block diagram illustrating functions of components of the controller 101 of the server 100 and the controller 201 of the server 200.

Referring to FIG. 4 together with FIG. 1 and FIG. 2, the controller 101 of the server 100 includes a power load predictor 110, a localizer 120, a natural power generation predictor 130, and an optimum load calculator 140. For example, those components are implemented by the processor and the programs to be executed by the processor. The implementation method is not limited to this method, and the components may be implemented by dedicated hardware (electronic circuit).

The power load predictor 110 predicts a power load of the factory 500 in the target period by using information stored in the storage 102 (for example, measurement data and production schedule described below). As the power load increases, power consumption increases.

The server 100 sequentially measures conditions of the factory 500 (for example, power load, temperature, and solar irradiance) by using sensors (not illustrated), and records measured values in the storage 102. The data recorded in the storage 102 is the measurement data. The power load predictor 110 may use the measurement data for the power load prediction. The power load of the factory 500 may fluctuate depending on the temperature and the solar irradiance. For example, the power load of the air conditioners in the building 510 increases as a deviation of the temperature from a comfortable range (for example, about 27° C. in summer) increases.

The storage 102 stores the production schedule of the factory 500. Any user may input the production schedule to the server 100 via an input device (not illustrated). The power load predictor 110 predicts a utilization rate of the factory 500 to keep to the production schedule. As the utilization rate increases, the number of operating facilities increases and the power load increases. For example, in an automobile manufacturing factory, the utilization rate of the factory 500 is predicted to increase as the number of automobiles to be produced in the production schedule increases. To predict the power load of the factory 500, the power load predictor 110 may use a power load (measurement data) of production achieved along a production schedule in the past.

The localizer 120 predicts a weather condition in the target period by using a current weather condition (measurement data) and weather forecast data. The server 100 sequentially acquires weather conditions (for example, solar irradiance) predicted by the Weather Bureau, and records the weather conditions in the storage 102. The data recorded in the storage 102 is the weather forecast data. By using the weather forecast data, the localizer 120 can predict how the current weather condition changes with an elapse of time. The localizer 120 may calculate a transition of the weather condition in the target period by using a predetermined mathematical expression. The prediction accuracy of the localizer 120 may be increased by machine learning.

The natural power generation predictor 130 predicts electric power to be generated by the nature-fluctuating power supply 530 in the target period by using the weather condition in the target period that is predicted by the localizer 120. The natural power generation predictor 130 may determine a transition of the electric power to be generated by the nature-fluctuating power supply 530 in the target period based on the predicted weather condition in the target period by using a predetermined power generation prediction map. The power generation prediction map shows a relationship between the weather condition (for example, solar irradiance) and the electric power to be generated by the nature-fluctuating power supply 530. As the solar irradiance increases, the electric power generated through the PV power generation tends to increase. Since the power generation performance of the nature-fluctuating power supply 530 may change over time, the power generation prediction map may be updated by learning. For example, the server 100 may sequentially measure the weather conditions and the electric power generated by the nature-fluctuating power supply 530, and update the power generation prediction map based on the measured data.

The optimum load calculator 140 calculates an optimum power load of the factory 500 by using optimization information stored in the storage 102. The optimum power load of the factory 500 that is calculated by the optimum load calculator 140 is hereinafter referred to also as "optimum factory load". The optimization information contains the maximum contract power, information for calculating an electric power cost, information for calculating a $CO_2$ emission factor, and record data on an EV charge/discharge capacity. The EV charge/discharge capacity is a range of electric energy adjustable by a vehicle group (vehicles 10) managed by the aggregator in the target period. Results of calculation of the EV charge/discharge capacity sequentially fed back from the server 200 to the server 100 are accumulated in the storage 102 as the record data on the EV charge/discharge capacity. When the optimum load calculator 140 calculates the optimum factory load, the optimum load calculator 140 has not received the results of calculation of the EV charge/discharge capacity from the server 200. Therefore, the optimum load calculator 140 predicts the EV charge/discharge capacity based on the record data on the EV charge/discharge capacity.

Figure 5:
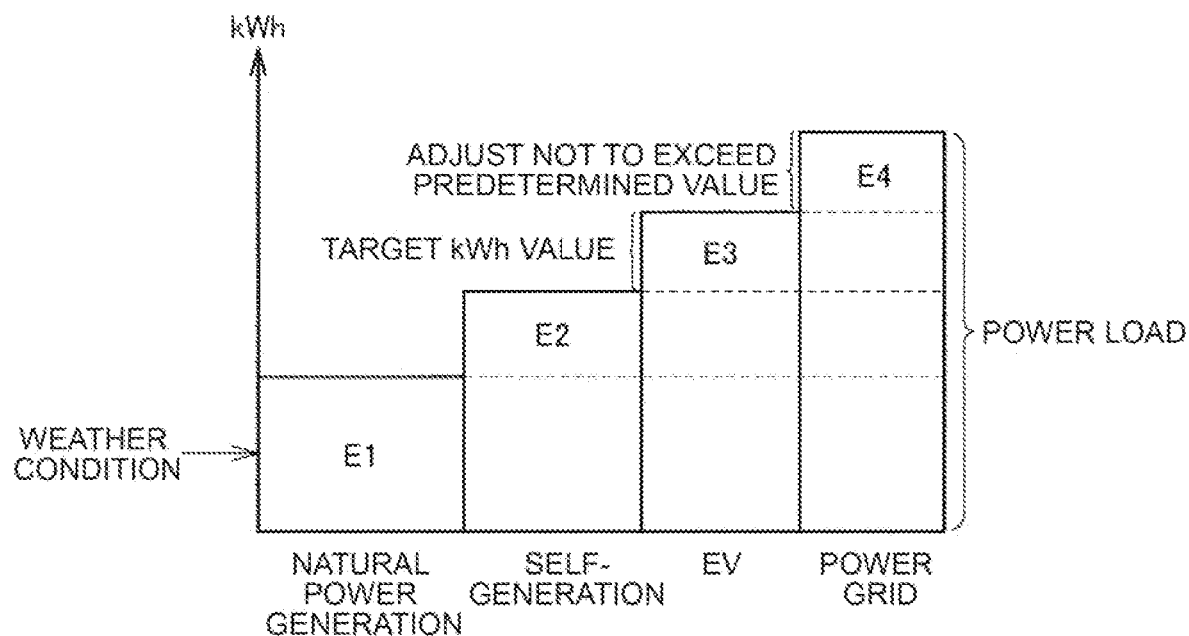
FIG. 5 is a diagram for describing a method for calculating an optimum factory load by the aggregator server illustrated in FIG. 4.

The optimum load calculator 140 determines the optimum factory load to prevent a value obtained by doubling the electric energy to be supplied from the power grid PG to the microgrid MG in the target period from exceeding the maximum contract power. The optimum load calculator 140 also determines the optimum factory load to sufficiently reduce the electric power cost and the $CO_2$ emission factor. FIG. 5 is a diagram for describing a method for calculating the optimum factory load by the optimum load calculator 140.

Referring to FIG. 5 together with FIG. 1 to FIG. 4, electric energy to be generated by the nature-fluctuating power supply 530 in the target period (hereinafter referred to also as "natural power generation energy E1") is basically determined based on the weather condition in the target period. The natural power generation energy E1 is determined so as not to exceed the power storage capacity of the factory 500. The server 100 controls the nature-fluctuating power supply 530 to limit the electric power to be generated by the nature-fluctuating power supply 530. When the electric energy generated by the nature-fluctuating power supply 530 is excessively large and exceeds the power storage capacity of the factory 500, the server 100 transmits a command to limit the electric power to be generated (natural power generation limiting command) to the nature-fluctuating power supply 530.

Electric energy to be generated by the generator 540 in the target period (hereinafter referred to also as "self-generation energy E2") is determined to prevent the $CO_2$ emission factor from increasing excessively. The server 100 can control the electric power to be generated by the generator 540 by using a command to control the generator 540 (self-generation command).

Electric energy to be supplied from the vehicles 10 to the microgrid MG in the target period (hereinafter referred to also as "EV energy E3") is determined within the range of the EV charge/discharge capacity. The server 100 can control the EV energy E3 by transmitting, to the server 200, a signal for requesting the vehicles 10 to execute charge and discharge (EV charge/discharge request). The EV charge/discharge request corresponds to the second request signal. The EV energy E3 corresponds to the target kWh value.

Electric energy to be supplied from the power grid PG to the microgrid MG in the target period (hereinafter referred to also as "PG energy E4") is adjusted so as not to exceed the maximum contract power when converted in the unit of kWh/h. The PG energy E4 is basically determined based on the power load of the factory 500, the natural power generation energy E1, the self-generation energy E2, and the EV energy E3. The PG energy E4 covers an amount of energy that is insufficient for electric energy to be consumed by the power load of the factory 500 despite the natural power generation energy E1, the self-generation energy E2, and the EV energy E3.

The power load of the factory 500 (optimum factory load) is determined to prevent the electric power cost from increasing excessively. The server 100 can control the power load of the factory 50) by using a load adjustment command. The load adjustment command is a control signal for each of the electric devices in the building 510 and the industrial facilities 520. For example, the server 100 can reduce the power load of the factory 500 by limiting the use of the air conditioners in the building 510. The server 100 can also reduce the power load of the factory 500 by temporarily stopping (or reducing power of) the industrial facilities 520 (for example, the electric melting furnace and the holding furnace).

The optimum load calculator 140 determines the natural power generation energy E1, the self-generation energy E2, the EV energy E3, the PG energy E4, and the optimum factory load from the viewpoints described above, and executes the demand-and-supply adjustment in the microgrid MG by using the load adjustment command, the natural power generation limiting command, the self-generation command, and the second request signal (EV charge/discharge request). The server 100 according to this embodiment generates the second request signal by using the electric energy to be generated by the nature-fluctuating power supply 530 in the factory 500 and the power load of the factory 500 to prevent the electric energy to be supplied from the power grid PG to the factory 500 (microgrid MG)

in the target period from exceeding a predetermined value. The generated second request signal is transmitted from the server 100 to the server 200.

Referring back to FIG. 4 together with FIG. 1 and FIG. 2, the controller 201 of the server 200 includes a demand-and-supply adjustment load distribution calculator 210, an EV charge/discharge capacity calculator 220, an EV charge/discharge optimization calculator 230, and an EV charge/discharge command generator 240. For example, those components are implemented by the processor and the programs to be executed by the processor. The implementation method is not limited to this method, and the components may be implemented by dedicated hardware (electronic circuit).

The demand-and-supply adjustment load distribution calculator 210 acquires the first request signal (demand-and-supply adjustment request) for the target period from the server 300, and determines a demand-and-supply adjustment load to be distributed to the power adjustment resources for the demand-and-supply adjustment in the power grid PG requested by the first request signal. The first request signal may be a signal for requesting adjustment power for executing frequency adjustment in the power grid PG within a predetermined response period (for example, five minutes). A requested interval of the frequency adjustment may be equal to or longer than 0.5 seconds and equal to or shorter than 30 seconds. The demand-and-supply adjustment load is distributed to the vehicle group (vehicles 10) and the stationary power storage device 30 managed by the server 200. The demand-and-supply adjustment load may be distributed by any method, and may be distributed to the vehicle group and the stationary power storage device 30 at a predetermined ratio. The predetermined ratio may be variable. The demand-and-supply adjustment load distribution calculator 210 may distribute the load to the stationary power storage device 31 in a case of demand-and-supply adjustment that requests a short response period.

By determining the demand-and-supply adjustment load as described above, demand-and-supply adjustment in the power grid PG that is requested for the vehicle group by the first request signal (hereinafter referred to also as "first PG demand-and-supply adjustment") and demand-and-supply adjustment in the power grid PG that is requested for the stationary power storage device 30 by the first request signal (hereinafter referred to also as "second PG demand-and-supply adjustment") are determined. The server 200 causes the stationary power storage device 30 to execute the second PG demand-and-supply adjustment by transmitting, to the stationary power storage device 30, a signal for requesting charge and discharge associated with the second PG demand-and-supply adjustment (stationary charge/discharge command). The first PG demand-and-supply adjustment is reported from the demand-and-supply adjustment load distribution calculator 210 to the EV charge/discharge command generator 240.

The EV charge/discharge capacity calculator 220 calculates an EV charge/discharge capacity by using operation schedules of the vehicles 10 (for example, a driving schedule of a POV or a service schedule of a MaaS vehicle) and conditions of the vehicles 10 connected to the EVSEs 20 (for example, SOCs of the power storage devices 11). For example, the EV charge/discharge capacity calculator 220 designates, as standby vehicles (that is, vehicles capable of adjusting electric power in the target period), vehicles currently connected to the EVSEs 20 and having no traveling schedule in the target period. The EV charge/discharge capacity calculator 220 calculates a range of electric energy adjustable by the standby vehicles in the target period based on the SOCs of the power storage devices 11 of the standby vehicles. Thus, the range of the electric energy adjustable by the vehicle group (that is, the EV charge % discharge capacity) is obtained. The calculated EV charge/discharge capacity is fed back from the server 200 to the server 100.

The EV charge/discharge optimization calculator 230 selects, from among the standby vehicles, adjustment vehicles for responding to both the requests of the first request signal and the second request signal. At this time, the EV charge/discharge optimization calculator 230 distributes, to the adjustment vehicles, adjustment power for the demand-and-supply adjustment in the microgrid MG (electric energy adjustment) that is requested by the second request signal (hereinafter referred to also as "kWh adjustment power"). The EV charge/discharge optimization calculator 230 may determine the kWh adjustment power to be distributed to the adjustment vehicles based on conditions of the adjustment vehicles (for example, SOCs of the power storage devices 11).

The EV charge/discharge command generator 240 acquires vehicle IDs of the adjustment vehicles and the kWh adjustment power distributed to the adjustment vehicles from the EV charge/discharge optimization calculator 230. The EV charge/discharge command generator 240 acquires, from the demand-and-supply adjustment load distribution calculator 210, information on the first PG demand-and-supply adjustment (for example, frequency adjustment) that is requested for the vehicle group by the first request signal, and distributes, to the adjustment vehicles, adjustment power for the first PG demand-and-supply adjustment (hereinafter referred to also as "ΔkW adjustment power"). The ΔkW adjustment power may be distributed evenly to the adjustment vehicles.

The EV charge/discharge command generator 240 generates power command signals for the adjustment vehicles to respond to both the requests of the first request signal and the second request signal in the target period. More specifically, the EV charge/discharge command generator 240 generates the power command signals for the adjustment vehicles based on the kWh adjustment power and the ΔkW adjustment power distributed to the adjustment vehicles. For example, the EV charge/discharge command generator 240 may generate the power command signals for the adjustment vehicles by converting the kWh adjustment power and the ΔkW adjustment power distributed to the adjustment vehicles into power signals and superimposing the power signals together. The EV charge/discharge command generator 240 may also generate the power command signals for the adjustment vehicles by correcting a power command signal for the ΔkW adjustment power common to the adjustment vehicles based on kWh adjustment powers distributed to the adjustment vehicles (that is, electric energies to be adjusted by the adjustment vehicles in the target period) (for example, by adding the kWh adjustment powers).

The method for generating the power command signals is described below based on specific examples. In a first example and a second example described below, the length of the target period is 180 seconds. The length of the target period may be changed as appropriate.

Figure 6:
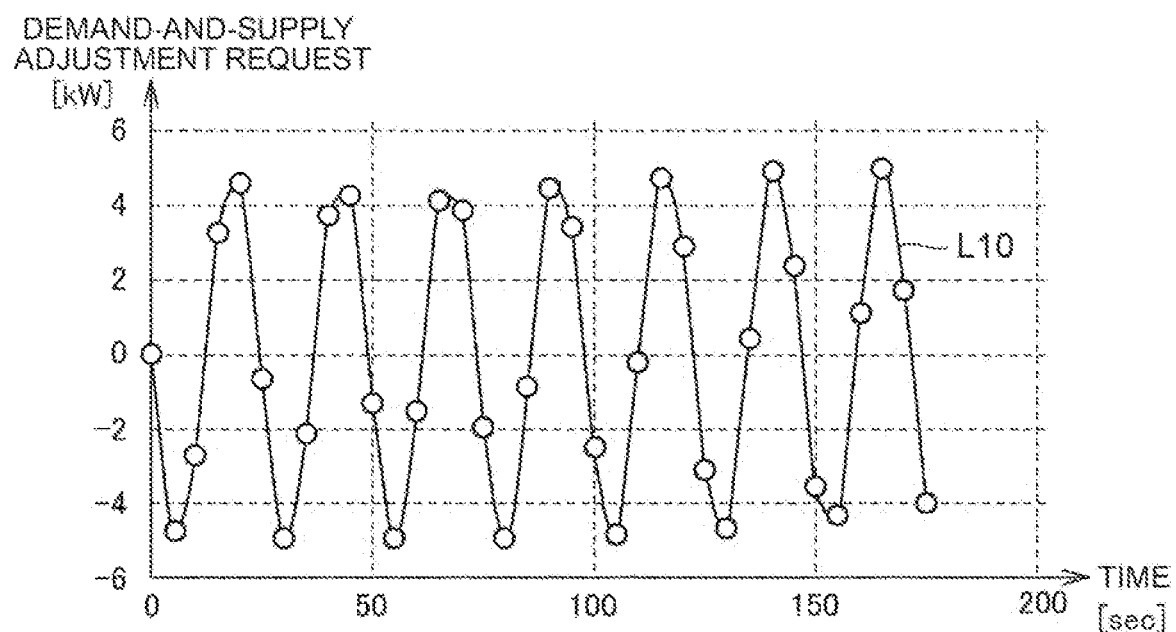
FIG. 6 is a diagram illustrating a first power signal generated from a first request signal (request for demand-and-supply adjustment) according to examples.

FIG. 6 is a diagram illustrating an example of a first power signal generated from the first request signal (request for demand-and-supply adjustment). Referring to FIG. 6 together with FIG. 4, the first power signal according to the examples is a waveform signal represented by a line L10, and indicates a power value that fluctuates periodically within a range of ±5 kW. The first power signal is a request to execute frequency adjustment along the waveform (line L10). The first power signal is generated from the first request signal for alternately requesting charge and discharge. The EV charge/discharge command generator 241) generates first power signals for the adjustment vehicles based on the first request signal to cause the vehicle group to execute the first PG demand-and-supply adjustment requested by the first request signal.

FIG. 7 is a diagram illustrating a target kWh value requested by the second request signal and a second power signal generated from the target kWh value according to the first example.

Referring to FIG. 7 together with FIG. 4, the target kWh value requested by the second request signal according to the first example (for example, a target kWh value assigned to one adjustment vehicle) is 1 kWh. The EV charge/discharge command generator 240 acquires a transition of electric energy in the target period to convert the target kWh value into the second power signal. The transition of the electric energy in the target period may be transmitted from the server 100 to the server 200 together with the target kWh value, or may be created by the EV charge/discharge command generator 240. The EV charge/discharge command generator 240 generates the second power signal that satisfies the target kWh value (1 kWh) based on the transition of the electric energy. In the example illustrated in FIG. 7, a line L21 represents the transition of the electric energy in the target period. The second power signal indicates a transition of a power value in the target period. In the example illustrated in FIG. 7, a line L22 represents the second power signal. The transition of the electric energy in the target period (line L21) exhibits an increase at a constant rate. Therefore, the power value requested to satisfy the target kWh value (1 kWh) is evenly distributed in the target period. The second power signal represented by the line L22 is a request to set the power value in the target period to a constant value (20 kW).

Figure 8:
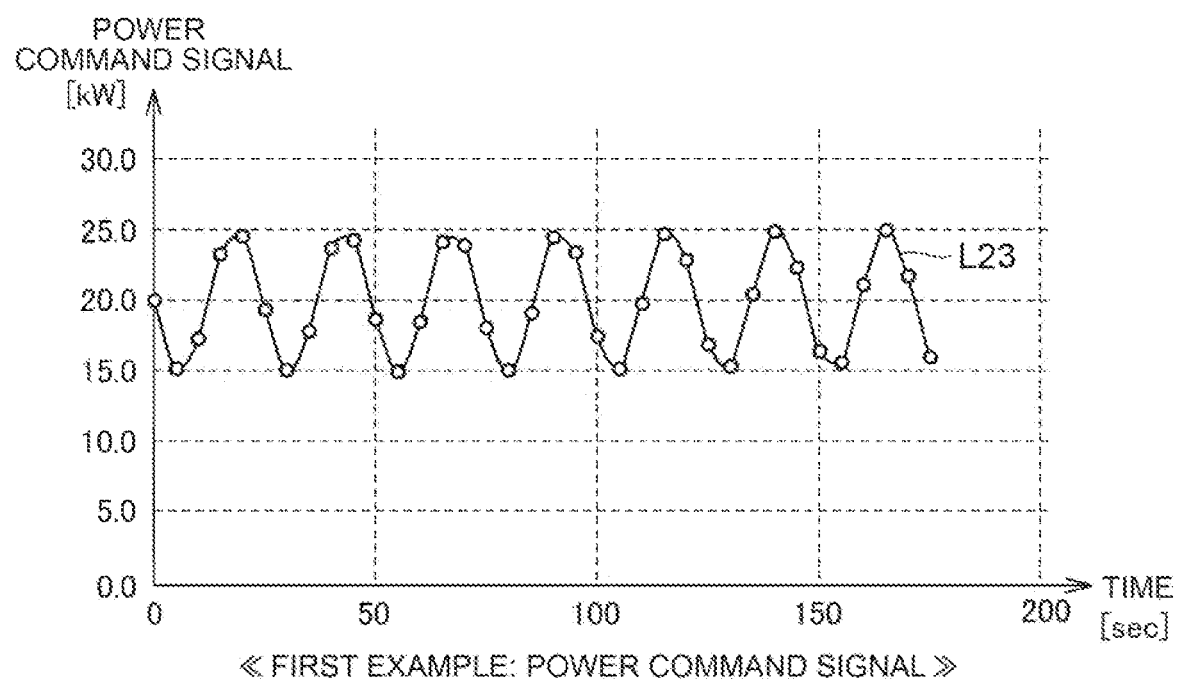
FIG. 8 is a diagram illustrating a power command signal according to the first example.

FIG. 8 is a diagram illustrating a power command signal according to the first example. Referring to FIG. 8 together with FIG. 4, the EV charge/discharge command generator 240 in the first example generates the power command signal for each adjustment vehicle by superimposing the first power signal (line L10) illustrated in FIG. 6 and the second power signal (line L22) illustrated in FIG. 7. In the example illustrated in FIG. 8, a line L23 represents the power command signal. The power command signal corresponds to a power command that responds simultaneously to both the requests of the first power signal and the second power signal in the first example.

Figure 9:
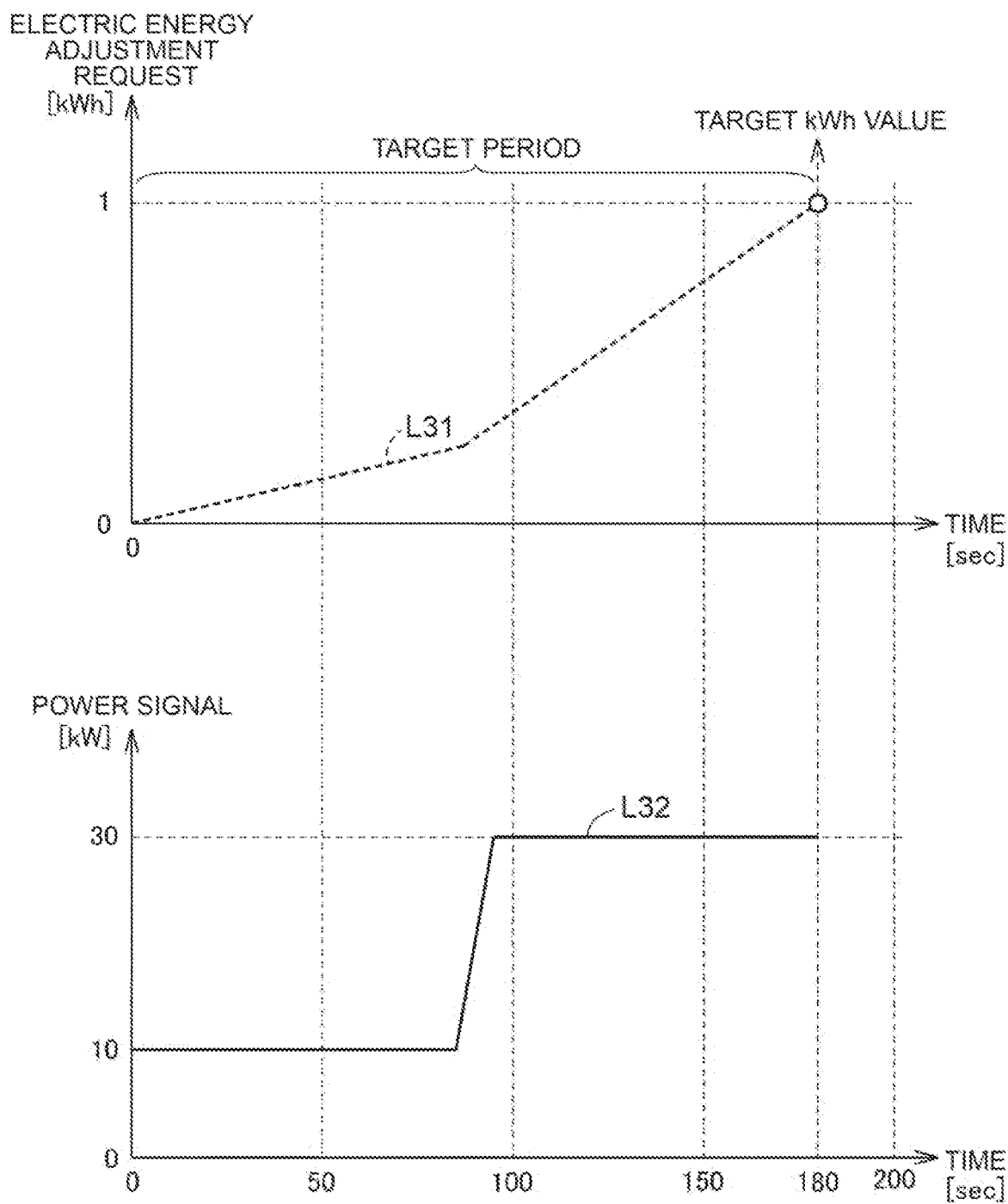
FIG. 9 is a diagram illustrating a target kWh value requested by a second request signal and a second power signal generated from the target kWh value according to a second example.

FIG. 9 is a diagram illustrating a target kWh value requested by the second request signal and a second power signal generated from the target kWh value according to the second example.

Referring to FIG. 9 together with FIG. 4, the target kWh value requested by the second request signal according to the second example (for example, a target kWh value assigned to one adjustment vehicle) is 1 kWh similarly to the first example. The EV charge/discharge command generator 240 acquires a transition of electric energy in the target period, and generates the second power signal that satisfies the target kWh value (1 kWh) based on the transition of the electric energy. In the example illustrated in FIG. 9, a line L31 represents the transition of the electric energy in the target period. The second power signal indicates a transition of a power value in the target period. In the example illustrated in FIG. 9, a line L32 represents the second power signal. The transition of the electric energy in the target period (line L31) exhibits an increase at a low rate followed by an increase at a high rate. The power value requested to satisfy the target kWh value (1 kWh) in the target period is distributed based on the transition of the electric energy. The second power signal represented by the line L32 is a request to first set a low power value (10 kW) and then set a high power value (30 kW).

Figure 10:
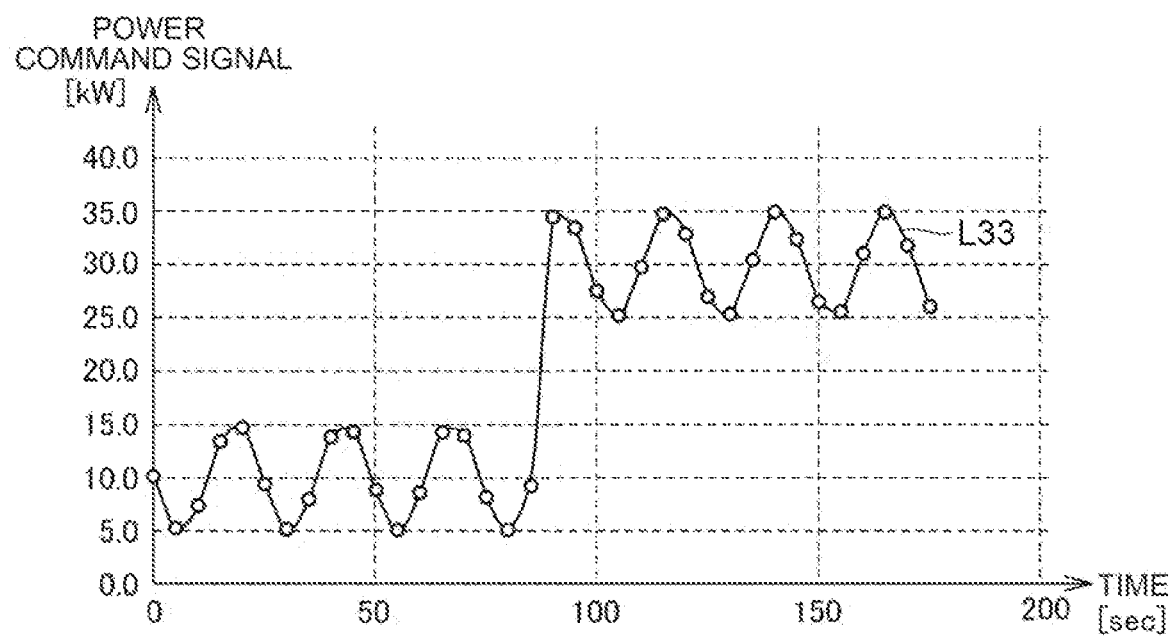
FIG. 10 is a diagram illustrating a power command signal according to the second example.

FIG. 10 is a diagram illustrating a power command signal according to the second example. Referring to FIG. 10 together with FIG. 4, the EV charge/discharge command generator 240 in the second example generates the power command signal for each adjustment vehicle by superimposing the first power signal (line L10) illustrated in FIG. 6 and the second power signal (line L32) illustrated in FIG. 9. In the example illustrated in FIG. 10, a line L33 represents the power command signal. The power command signal corresponds to a power command that responds simultaneously to both the requests of the first power signal and the second power signal in the second example.

Referring back to FIG. 4 together with FIG. 1 and FIG. 2, the EV charge/discharge command generator 240 controls charge and discharge of the power storage devices 11 of the adjustment vehicles by transmitting the generated power command signals (EV charge/discharge commands) to the adjustment vehicles. The adjustment vehicles operate in the target period based on the power command signals to function as the distributed kWh adjustment power and the distributed ΔkW adjustment power. Thus, the demand-and-supply adjustment in the power grid PG that is requested by the first request signal and the demand-and-supply adjustment in the microgrid MG that is requested by the second request signal are simultaneously executed in the target period.

As described above, the electric power system 1 according to this embodiment includes the power adjustment resources (for example, the vehicle group including the vehicles 10) electrically connectable to the power grid PG, and the management devices (servers 100 and 200) configured to manage the power adjustment resources. The server 200 acquires, from the server 300, the first request signal for requesting the demand-and-supply adjustment in the power grid PG. The server 100 generates the second request signal for requesting the power adjustment resources (vehicle group) to adjust the electric energy in the predetermined period (target period). The server 200 acquires the second request signal from the server 100. The server 200 generates the power command signals indicating the command power values for each predetermined interval in the target period to respond to both the requests of the first request signal and the second request signal, and transmits the generated power command signals to the predetermined power adjustment resources (adjustment vehicles) included in the power adjustment resources.

In the electric power system 1 having the configuration described above, the predetermined power adjustment resources can be commanded to execute both the demand-and-supply adjustment in the power grid PG and the electric energy adjustment in the target period based on the generated power command signals. The predetermined power adjustment resources operate based on the command power values indicated by the power command signals to respond simultaneously to both the request for the demand-and-supply adjustment in the power grid and the request for the electric energy adjustment in the target period.

The first request signal may be a signal for requesting a governor-free operation (local control). For example, the EV charge/discharge command generator 240 measures a power frequency of the microgrid MG connected to the power grid PG, generates control signals for causing the adjustment vehicles to execute power adjustment through the governor-free operation (for example, power adjustment for keeping the power frequency within a predetermined range), and adds, to the control signals, the kWh adjustment power distributed to the adjustment vehicles. Thus, the EV charge/discharge command generator 240 generates power command signals that respond to both the request of the first request signal (request for the demand-and-supply adjustment in the power grid PG through the governor-free operation) and the request of the second request signal (kWh adjustment power). By transmitting the generated power command signals to the adjustment vehicles, the adjustment vehicles simultaneously execute the demand-and-supply adjustment in the power grid PG and the demand-and-supply adjustment in the microgrid MG.

The computer configured to transmit the first request signal (server 300) is not limited to the server of the power transmission/distribution utility (for example, the power company), and may be a server in a demand-and-supply adjustment market. The length of the target period in the second request signal is not limited to three minutes (180 seconds) or 30 minutes, and may be changed as appropriate. The command interval in the power command signal is not limited to 0.5 seconds, and may be changed as appropriate.

In the embodiment described above, the server 200 generates the power command signal for the motor vehicle (vehicle 10) to respond to both the requests of the first request signal and the second request signal. The server 200 may generate the power command signal for a power adjustment resource other than the motor vehicle to respond to both the requests of the first request signal and the second request signal. The kWh adjustment power and the ΔkW adjustment power for the generation of the power command signal may be distributed at variable ratios depending on the types of the power adjustment resources. For example, the secondary battery can quickly respond to a charge/discharge request, but has difficulty in continuing charge or discharge for a long period due to the limited capacity. The steam turbine generator slowly responds to a power generation request, but can continue power generation for a long period. When the server 200 generates the power command signals for the secondary battery and the steam turbine generator to respond to both the requests of the first request signal and the second request signal, the secondary battery may have a small distribution ratio for the kWh adjustment power and a large distribution ratio for the ΔkW adjustment power, whereas the steam turbine generator may have a small distribution ratio for the ΔkW adjustment power and a large distribution ratio for the kWh adjustment power. The gas engine generator and other generators have characteristics similar to that of the steam turbine generator.

The aggregator server (server 200) may receive second request signals from a plurality of FEMS servers (servers 100) and execute the processes illustrated in FIG. 3 for individual factories, thereby generating the power command signals for the individual factories to respond to both the requests of the first request signal and the second request signal. The adjustment vehicles may be controlled to simultaneously execute the demand-and-supply adjustment in the power grid PG and the demand-and-supply adjustment in the microgrids of the individual factories by transmitting the generated power command signals from the aggregator server to the adjustment vehicles.

Figure 11:
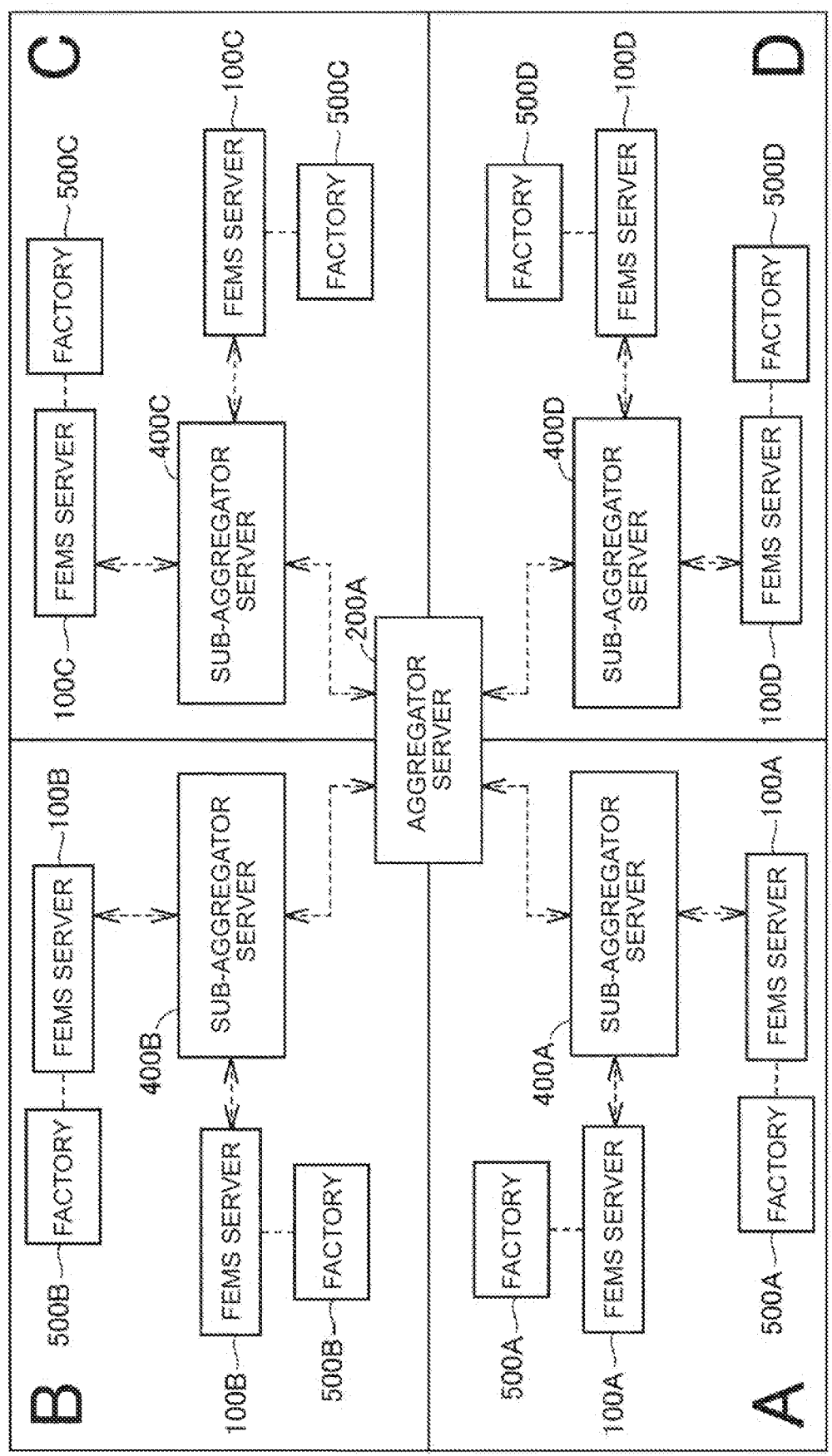
FIG. 11 is a diagram illustrating an electric power system to which sub-aggregator servers are applied according to a modified example of the embodiment of the present disclosure.

A sub-aggregator server may be provided between the aggregator server (server 200) and the FEMS server (server 100). The sub-aggregator server may be provided in each area. The sub-aggregator server may execute the demand-and-supply adjustment in the power grid that is requested from the aggregator server in cooperation with the FEMS server in a management area. FIG. 11 is a diagram illustrating an example of an electric power system to which sub-aggregator servers are applied. Referring to FIG. 11, FEMS servers 110A to 100D, sub-aggregator servers 400A to 400D, and factories 500A to 500D are present in areas A to D, respectively. An aggregator server 200A is communicable with all the sub-aggregator servers 400A to 400D. The sub-aggregator servers 400A to 400D are communicable with the FEMS servers 100A to 100D in their management areas, respectively. The sub-aggregator servers 400A to 400D are hereinafter referred to as "sub-aggregator servers 400" unless otherwise distinguished.

The aggregator server 200A belongs to an aggregator. The sub-aggregator server 400 belongs to a sub-aggregator. The aggregator may be an automobile manufacturer. The sub-aggregator may be a dealer. The dealer may manage sold vehicles by using the sub-aggregator server 400. The sub-aggregator server 400 has the functions of the server 200 illustrated in FIG. 4. That is, the sub-aggregator server 400 receives a first request signal from the aggregator server 200A, receives a second request signal from the FEMS server in the management area, and generates power command signals that respond to both requests of the first request signal and the second request signal. The sub-aggregator server 400 causes predetermined power adjustment resources (for example, motor vehicles) to execute power adjustment by transmitting the power command signals to the predetermined power adjustment resources. The predetermined power adjustment resources operate based on the power command signals to simultaneously execute the demand-and-supply adjustment in the power grid PG that is requested from the aggregator and the demand-and-supply adjustment in the microgrid of the factory in the management area. In this modified example, the sub-aggregator server 400 and the aggregator server 200A correspond to examples of "second computer" and "third computer" according to the present disclosure, respectively.

Figure 12:
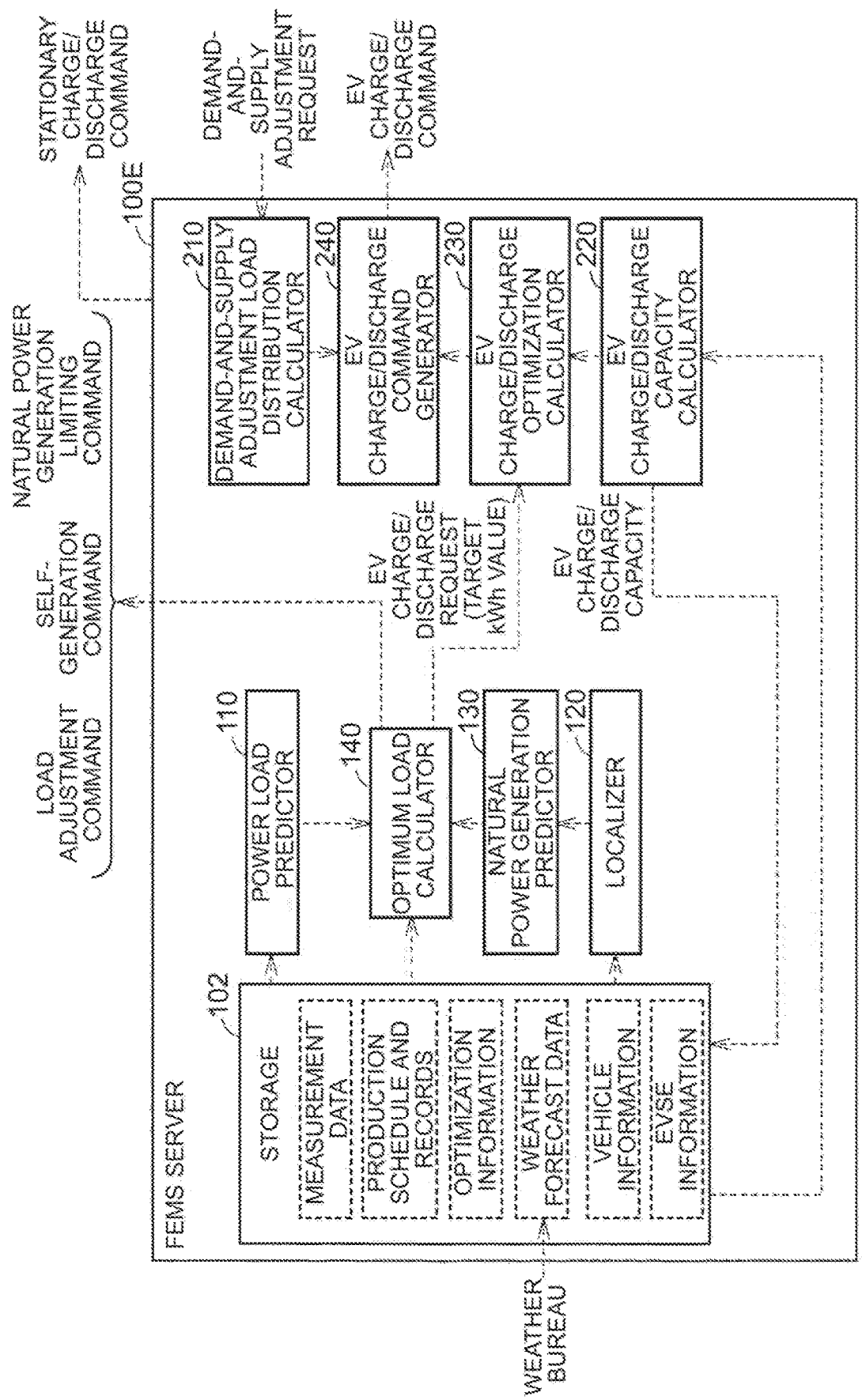
FIG. 12 is a diagram illustrating a modified example of the FEMS server illustrated in FIG. 4.

In the electric power system 1 according to the embodiment described above (FIG. 1 to FIG. 5), the FEMS server (server 100) may have the functions of the aggregator server (server 200) illustrated in FIG. 4 to omit the aggregator server. FIG. 12 is a diagram illustrating a modified example of the FEMS server illustrated in FIG. 4. Referring to FIG. 12, a FEMS server 100E according to this modified example has the functions of the aggregator server (server 200) illustrated in FIG. 4 in addition to the functions of the FEMS server (server 100) illustrated in FIG. 4. That is, the FEMS server 100E includes the power load predictor 110, the localizer 120, the natural power generation predictor 130, the optimum load calculator 140, the demand-and-supply adjustment load distribution calculator 210, the EV charge/discharge capacity calculator 220, the EV charge/discharge optimization calculator 230, and the EV charge/discharge command generator 240.

Figure 13:
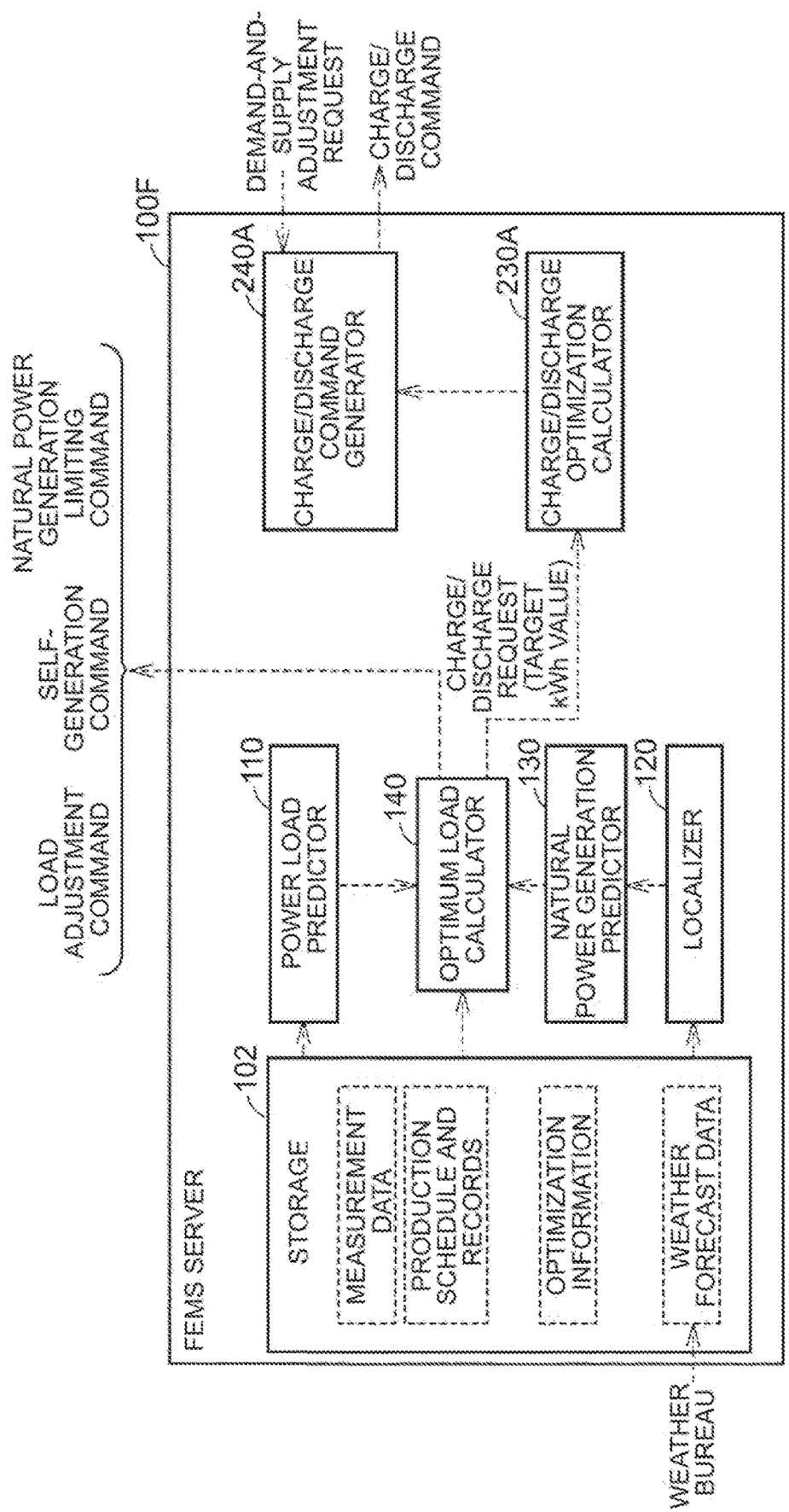
FIG. 13 is a diagram illustrating a modified example of the FEMS server illustrated in FIG. 12.

FIG. 13 is a diagram illustrating a modified example of the FEMS server illustrated in FIG. 12. Referring to FIG. 13, a FEMS server 100F according to this modified example is applied to an electric power system including a plurality of stationary power storage devices 30, and executes power adjustment by using the stationary power storage devices 30 in place of the vehicles 10. The FEMS server 100F includes a charge/discharge optimization calculator 230A and a charge/discharge command generator 240A.

The charge/discharge optimization calculator 230A acquires a second request signal (charge/discharge request) from the optimum load calculator 140, and selects any stationary power storage devices 30 from among the stationary power storage devices 30 to respond to both requests of a first request signal and the second request signal. The selected stationary power storage device 30 is hereinafter referred to also as "adjustment device". The charge/discharge optimization calculator 230A distributes, to the adjustment devices, adjustment power for the demand-and-supply adjustment in the microgrid MG (electric energy adjustment) that is requested by the second request signal (kWh adjustment power).

The charge/discharge command generator 240A acquires resource IDs of the adjustment devices and the kWh adjustment power distributed to the adjustment devices from the charge/discharge optimization calculator 230A. For example, the charge/discharge command generator 240A acquires the first request signal (demand-and-supply adjustment request) from the server 300, and distributes, to the adjustment devices, adjustment power for the demand-and-supply adjustment in the power grid PG (for example, frequency adjustment) that is requested by the first request signal (ΔkW adjustment power). The charge/discharge command generator 240A generates power command signals for the adjustment devices to respond to both the requests of the first request signal and the second request signal in the target period, and controls charge and discharge of the adjustment devices in the target period by transmitting the generated power command signals to the adjustment devices. Thus, the demand-and-supply adjustment in the power grid PG that is requested by the first request signal and the demand-and-supply adjustment in the microgrid MG that is requested by the second request signal are simultaneously executed in the target period.

The FEMS server 100F according to this modified example corresponds to an example of "charge-and-discharge controller" according to the present disclosure. The FEMS server 100F controls charge and discharge of the stationary power storage devices 30 electrically connectable to the power grid PG. The FEMS server 100F acquires the first request signal for requesting the demand-and-supply adjustment in the power grid PG, and the second request signal for requesting the stationary power storage devices 30 to adjust the electric energy in the predetermined period, and controls charge and discharge of the stationary power storage devices 30 to respond simultaneously to both the requests of the first request signal and the second request signal. According to this configuration, the charge and discharge of the stationary power storage devices 30 can be controlled to respond simultaneously to both the request for the demand-and-supply adjustment in the power grid PG and the request for the electric energy adjustment by the stationary power storage devices 30.

The stationary power storage device or the motor vehicle may have the function of generating the power command signal. In this case, the stationary power storage device or the motor vehicle generates the power command signal to respond to both the requests of the first request signal and the second request signal, and controls charge and discharge of its power storage device based on the generated power command signal. The stationary power storage device or the motor vehicle may generate the power command signal for executing a governor-free operation (local control) while measuring a power frequency.

The embodiment described above is directed to the example in which the electric power system is applied to the factory. The electric power system may be applied to any other business place (for example, a school, a hospital, a hotel, a bank, or a shopping mall). The computer configured to manage the business place is not limited to the FEMS server, and may be a BEMS server.

The configuration of the motor vehicle employed as the power adjustment resource is not limited to the configuration described in the embodiment described above. For example, the motor vehicle is not limited to the electric vehicle (EV), and may be a plug-in hybrid vehicle (PHV). The motor vehicle may be chargeable wirelessly. The vehicle group employed as the power adjustment resource may include a motor vehicle that supports only the external power charge but does not support the external power supply. The motor vehicle is not limited to a passenger car, and may be a bus or a truck. The motor vehicle may be driven autonomously, or may have a flying function. The motor vehicle may be a vehicle configured to travel without a driver (for example, an automated guided vehicle (AGV) or agricultural equipment).

It should be understood that the embodiment disclosed herein is illustrative but is not limitative in all respects. The scope of the present disclosure is defined by the claims rather than the description of the embodiment above, and is intended to encompass meanings of equivalents to the elements in the claims and all modifications within the scope of the claims.

What is claimed is:

1. An electric power system comprising:
   a plurality of power adjustment resources electrically connectable to a power grid; and
   a management device configured to manage the power adjustment resources, wherein:
   the power adjustment resources include a first power adjustment resource and a second power adjustment resource;
   the management device is configured to acquire a first request signal for requesting demand-and-supply adjustment in the power grid, and a second request signal for requesting the first power adjustment resource to adjust electric energy in a predetermined period;
   the management device is configured to transmit a power command signal indicating a command power value for each predetermined interval in the predetermined period to the first power adjustment resource;
   the management device is configured to generate the power command signal to respond to both requests of the first request signal and the second request signal;
   the second power adjustment resource is part of a microgrid that is supplied with electric power from the power grid under a power contract;
   the second request signal is for requesting demand-and-supply adjustment in the microgrid; and
   the second request signal requests the first power adjustment resource to adjust electric energy in the predetermined period to prevent an electric energy to be supplied from the power grid to the microgrid in the predetermined period from exceeding a maximum contract power, based on power generation of the microgrid and power load of the microgrid.

2. The electric power system according to claim 1, wherein the management device is configured to generate the power command signal by superimposing the first request signal and the second request signal.

3. The electric power system according to claim 1, wherein:

the first power adjustment resource includes a motor vehicle electrically connectable to the power grid;
the management device includes
a first computer configured to manage a business place, and
a second computer configured to manage the motor vehicle;
the first computer is configured to
generate the second request signal by using a power load of the business place, and
transmit the generated second request signal to the second computer; and
the second computer is configured to
receive the first request signal, and
generate the power command signal for the motor vehicle to respond to both the requests of the first request signal and the second request signal.

4. The electric power system according to claim 3, wherein:
the business place includes a nature-fluctuating power supply; and
the first computer is configured to generate the second request signal by using electric energy to be generated by the nature-fluctuating power supply in the business place and the power load of the business place to prevent electric energy to be supplied from the power grid to the business place in the predetermined period from exceeding a predetermined value.

5. The electric power system according to claim 3, wherein:
the first request signal is a signal for requesting frequency adjustment in the power grid; and
the second computer is configured to receive the first request signal from a third computer configured to manage demand and supply of the power grid.

6. The electric power system according to claim 1, wherein:
a length of the predetermined period is equal to or larger than three minutes; and the predetermined interval is equal to or shorter than 15 seconds.

7. The electric power system according to claim 1, wherein the predetermined period includes multiple predetermined intervals.

8. The electric power system according to claim 1, wherein the microgrid further includes a plurality of Electric Vehicle Supply Equipment (EVSE), and wherein each EVSE is configured to exchange electric power with a respective electric vehicle connected thereto.

9. The electric power system according to claim 8, wherein the microgrid further includes two or more items chosen from a stationary power storage device, a building, an industrial facility, a nature-fluctuating power supply, and a generator.

10. The electric power system according to claim 8, wherein the management device includes a load calculator configured to calculate a power load in the microgrid based on a prediction of charge and discharge capacity of electric vehicles connected to the plurality of EVSE.

11. The electric power system according to claim 8, wherein the management device is configured to calculate charge and discharge capacity of electric vehicles connected to the plurality of EVSE based on travelling schedules of the electric vehicles, and wherein the management device is configured to generate the power command signal based on the charge and discharge capacity of the electric vehicles and their respective travelling schedules.

12. The electric power system according to claim 8, wherein the first power adjustment resource includes electric vehicles connected to the plurality of EVSE, and wherein the management device distributes electric power to the electric vehicles for the demand-and-supply adjustment requested by the second request signal.

13. The electric power system according to claim 12, wherein the management device distributes the electric power to the electric vehicles based on state of charge (SOC) of the electric vehicles.

14. The electric power system according to claim 12, wherein the management device distributes the electric power evenly to the electric vehicles.

15. The electric power system according to claim 1, wherein the first power adjustment resource is part of the microgrid.

16. A server configured to:
manage a plurality of power adjustment resources electrically connectable to a power grid, the plurality of power adjustment resources including a first power adjustment resource and a second power adjustment resource;
receive a first request signal for requesting demand-and-supply adjustment in the power grid, and a second request signal for requesting the first power adjustment resource to adjust electric energy in a predetermined period;
generate a power command signal indicating a command power value for each predetermined interval in the predetermined period to respond to both requests of the first request signal and the second request signal; and
transmit the generated power command signal to the first power adjustment resource,
wherein the second power adjustment resource is part of a microgrid that is supplied with electric power from the power grid under a power contract;
the second request signal is for requesting demand-and-supply adjustment in the microgrid; and
the second request signal requests the first power adjustment resource to adjust electric energy in the predetermined period to prevent an electric energy to be supplied from the power grid to the microqrid in the predetermined period from exceeding a maximum contract power, based on power generation of the microgrid and power load of the microgrid.

17. A charge-and-discharge controller configured to:
manage a plurality of power adjustment resources including a first power adjustment resource and a second power adjustment resource, the second power adjustment resource being a power storage device electrically connectable to a power grid;
acquire a first request signal for requesting demand-and-supply adjustment in the power grid, and a second request signal for requesting the power storage device to adjust electric energy in a predetermined period; and
control charge and discharge of the power storage device to respond simultaneously to both requests of the first request signal and the second request signal, wherein
the power storage device is part of a microgrid that is supplied with electric power from the power grid under a power contract;
the second request signal is for requesting demand-and-supply adjustment in the microgrid; and
the second request signal requests the first power adjustment resource to adjust electric energy in the predetermined period to prevent an electric energy to be supplied from the power grid to the microgrid in the predetermined period from exceeding a maximum contract power, based on power generation of the microgrid and power load of the microgrid.

18. A power demand-and-supply adjustment method in an electric power system including a plurality of power adjustment resources including a first power adjustment resource and a second power adjustment resource connected to a power grid, wherein the second power adjustment resource is part of a microgrid that is supplied with electric power from the power grid under a power contract, the method comprising:

receiving a first request signal for requesting demand-and-supply adjustment in the power grid;

receiving a second request signal for requesting the first power adjustment resource to adjust electric energy in a predetermined period, wherein the second request signal is for requesting demand-and-supply adjustment in the microgrid and the second request signal requests the first power adjustment resource to adjust electric energy in the predetermined period to prevent an electric energy to be supplied from the power grid to the microgrid in the predetermined period from exceeding a maximum contract power, based on power generation of the microqrid and power load of the microqrid;

generating a power command signal indicating a command power value for each predetermined interval in the predetermined period to respond to both the first request signal and the second request signal; and controlling the power adjustment resource based on the power command signal.

* * * * *